May 2, 1967  M. C. TURKISH  3,316,890
CAMSHAFT FOR INTERNAL COMBUSTION ENGINE VALVE GEAR
Filed Sept. 12, 1966  13 Sheets-Sheet 1

LOADED AND DEFLECTED CAMSHAFT

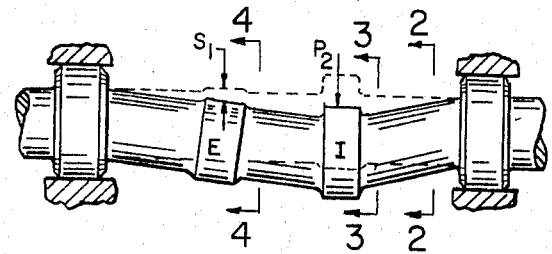

$P_2$ = VALVE SPRING LOAD ON INTAKE CAM
$S_1$ = DEFLECTION OF SHAFT AT EXHAUST CAM

FIG. 1

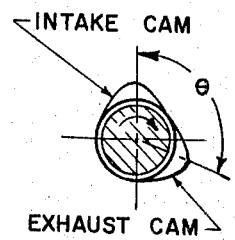

FIG. 2

THE PROBLEM

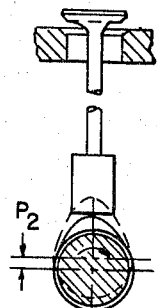

INTAKE OPENED
FIG. 3

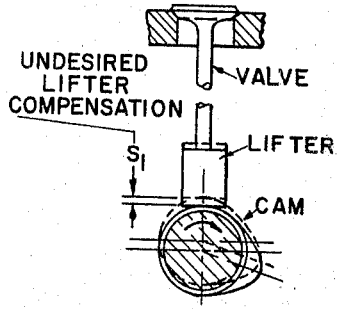

EXHAUST CLOSED
FIG. 4

FIG. 5

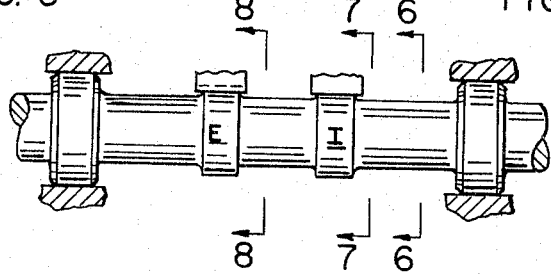

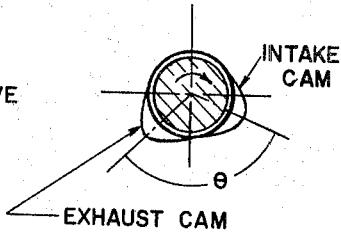

FIG. 6

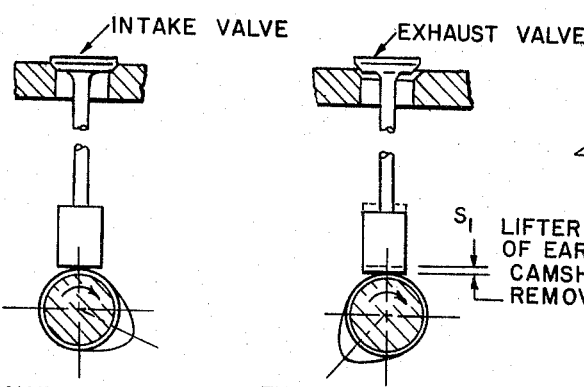

INTAKE VALVE SEATED
PROPERLY AFTER
DEFLECTION IS REMOVED.
FIG. 7

EXHAUST VALVE SLIGHTLY
OPENED BECAUSE OF LIFTER
COMPENSATION-VALVE SHOULD
BE CLOSED.
FIG. 8

$S_1$ LIFTER COMPENSATED BECAUSE
OF EARLIER DEFLECTION AFTER
CAMSHAFT DEFLECTION IS
REMOVED.

INVENTOR.
MICHAEL C. TURKISH
BY *Teagues & Toddey*
ATTORNEYS

May 2, 1967  M. C. TURKISH  3,316,890
CAMSHAFT FOR INTERNAL COMBUSTION ENGINE VALVE GEAR
Filed Sept. 12, 1966  13 Sheets-Sheet 2
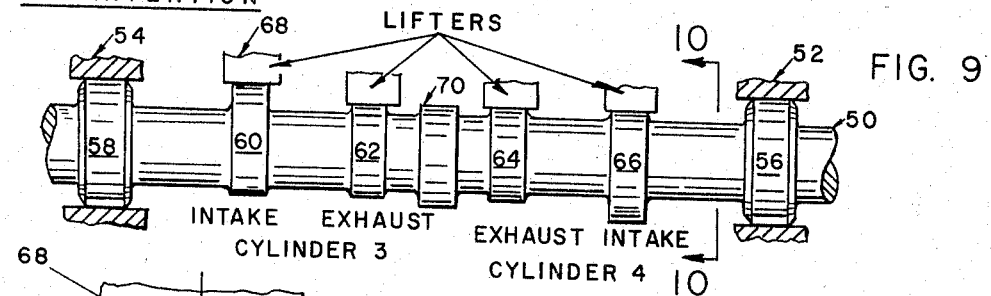
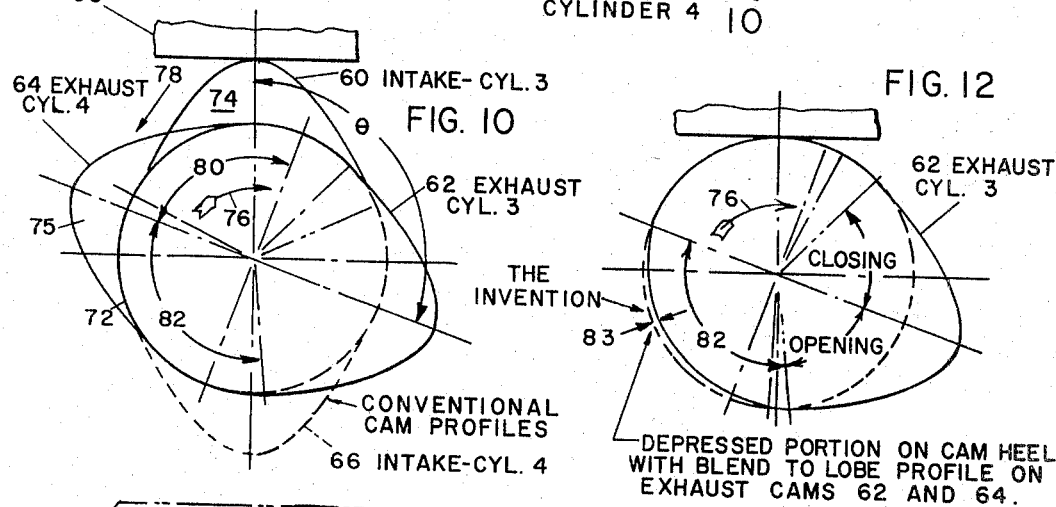
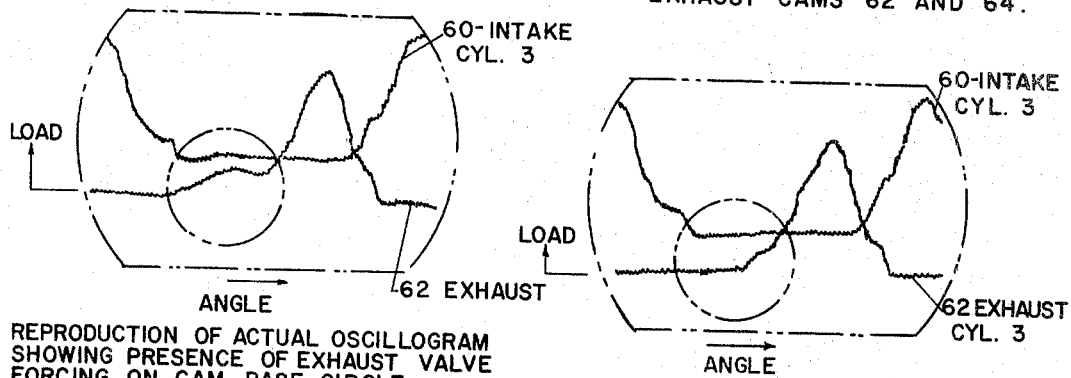
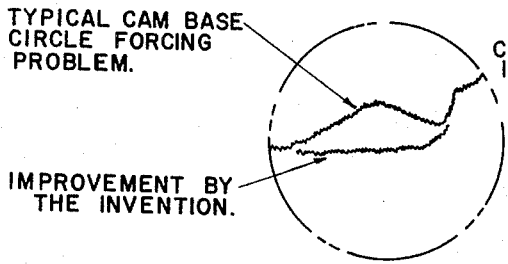
INVENTOR.
MICHAEL C. TURKISH
BY
ATTORNEYS

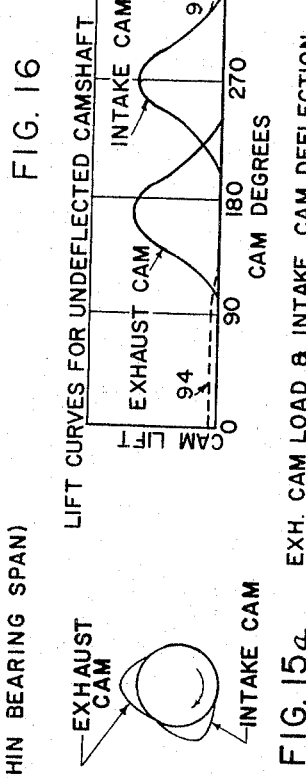
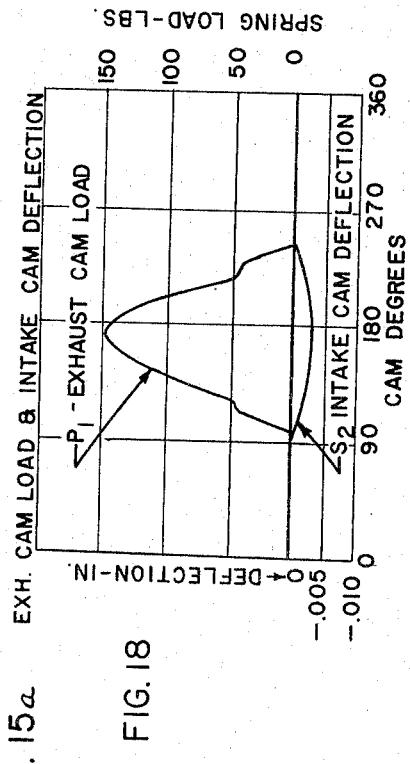
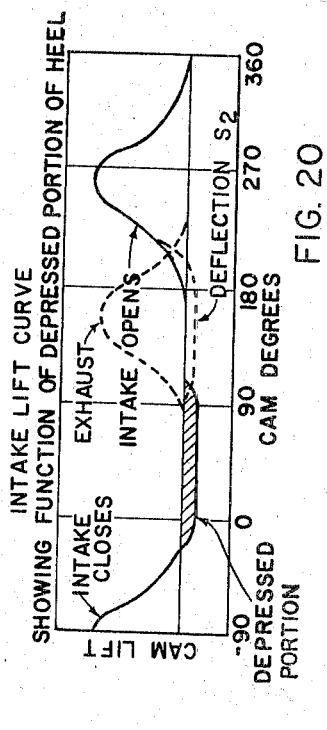
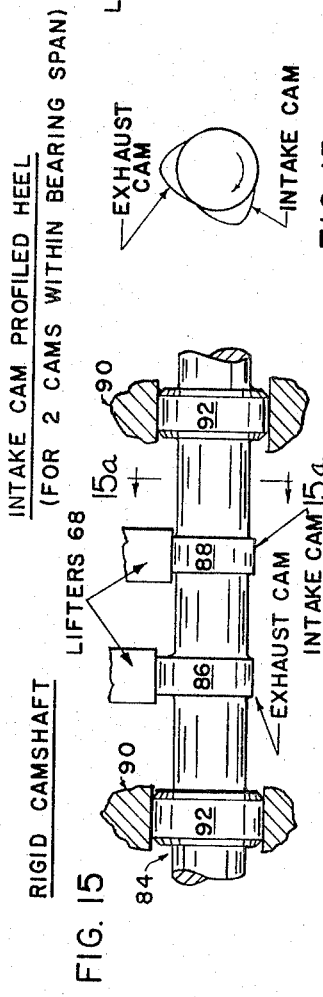
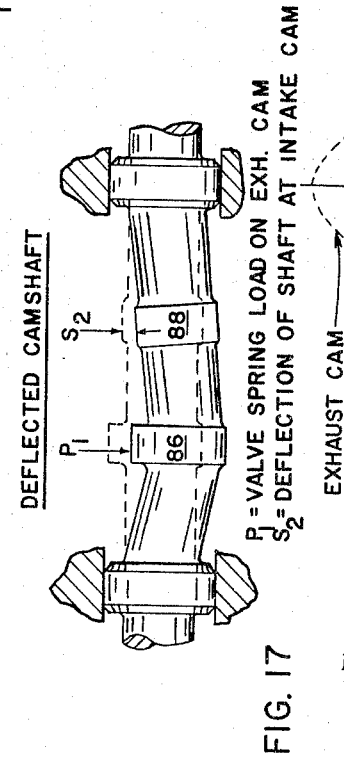
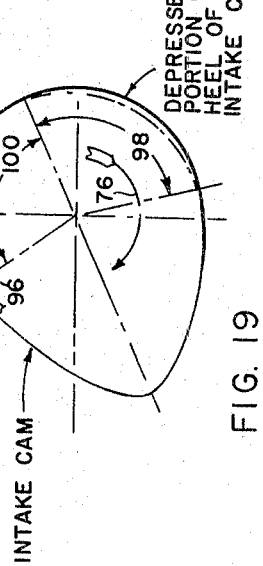

May 2, 1967　　　　　M. C. TURKISH　　　　3,316,890
CAMSHAFT FOR INTERNAL COMBUSTION ENGINE VALVE GEAR
Filed Sept. 12, 1966　　　　　　　　　　　　13 Sheets-Sheet 4

$P_2$ = VALVE SPRING LOAD ON INTAKE CAM
$S_1$ = DEFLECTION OF SHAFT AT EXHAUST CAM

INVENTOR.
MICHAEL C. TURKISH
BY
ATTORNEYS

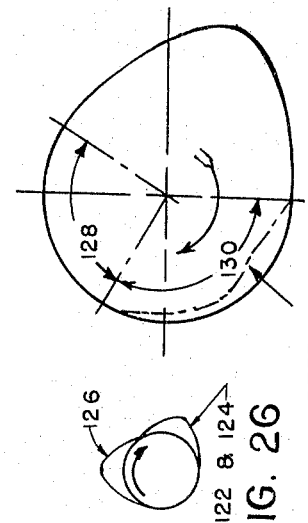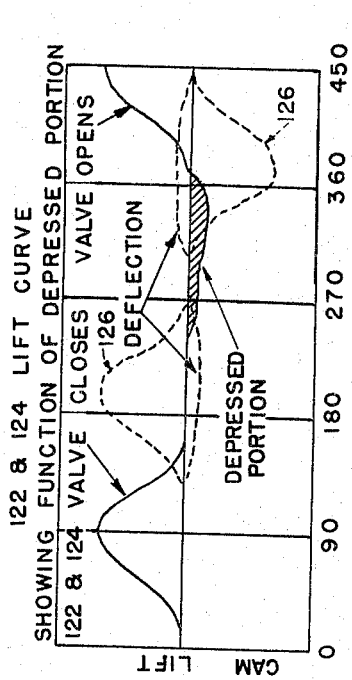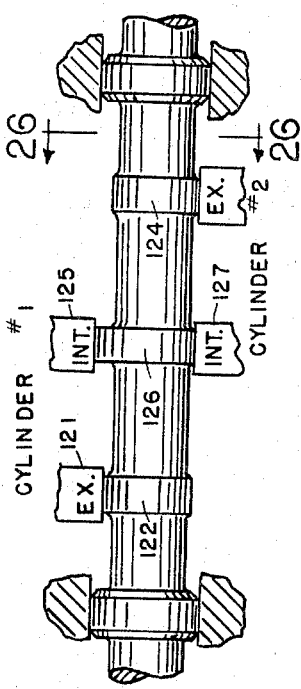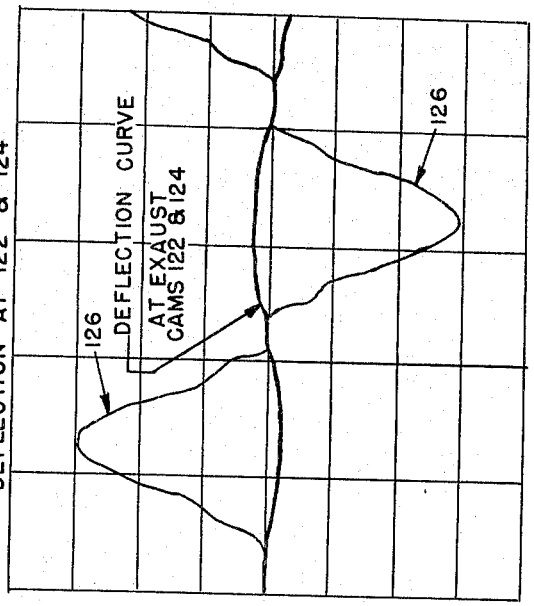

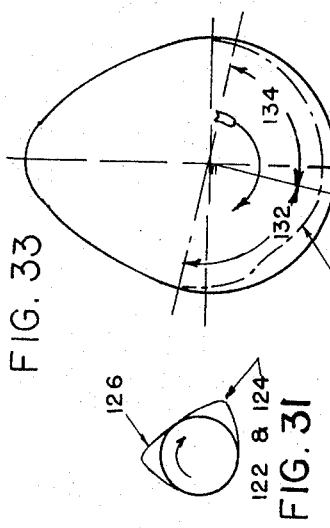
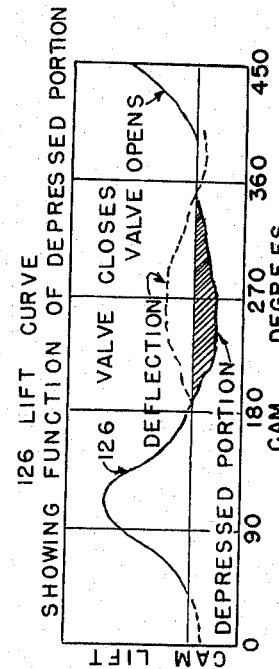
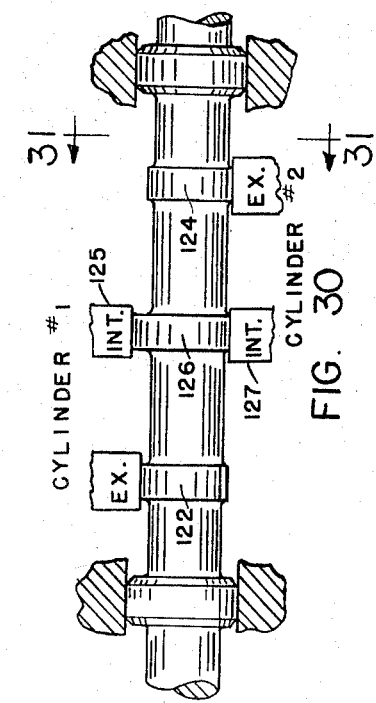
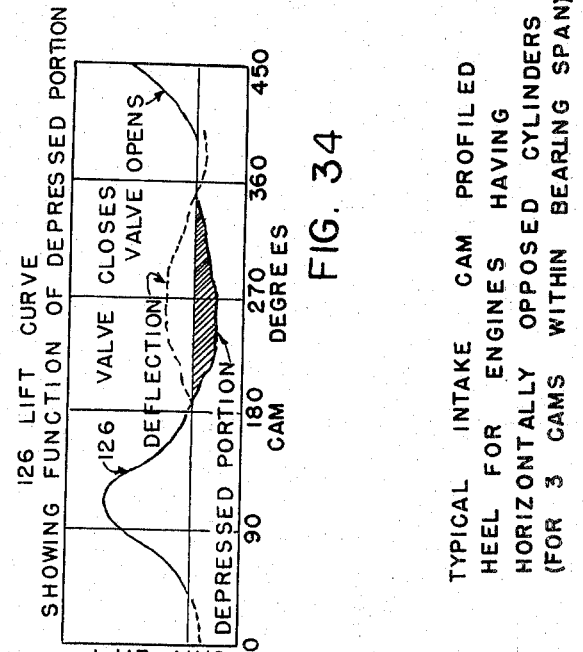
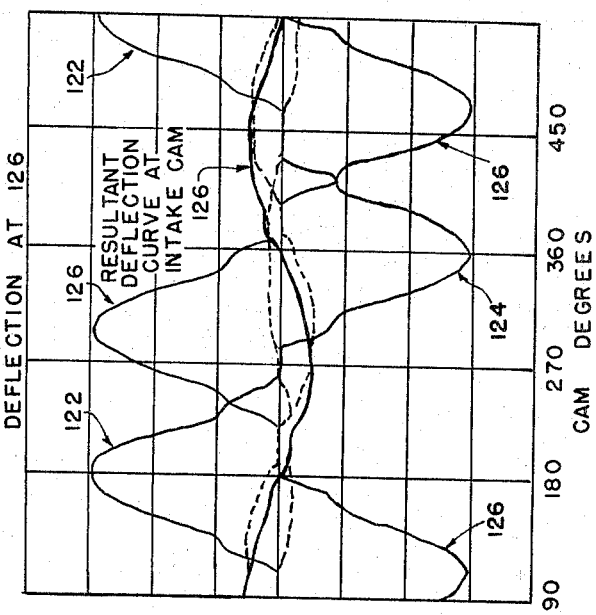

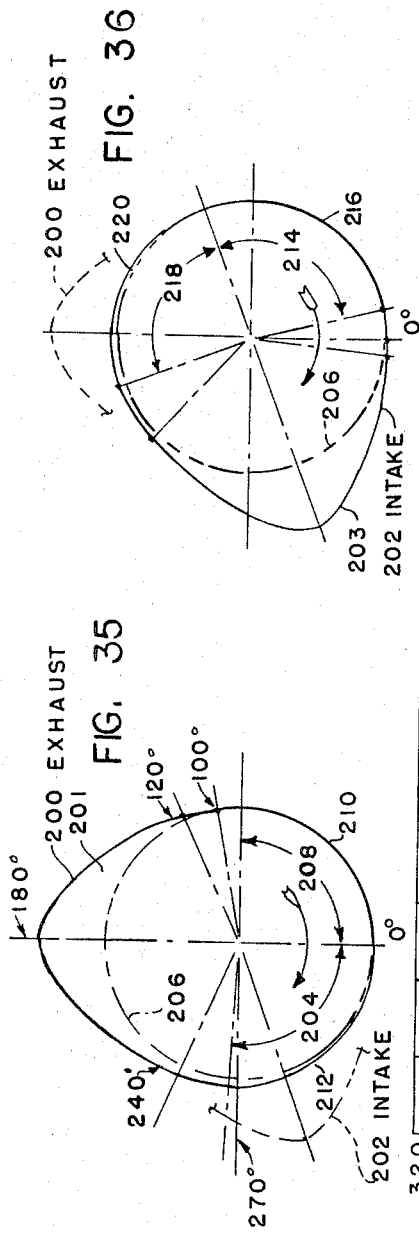
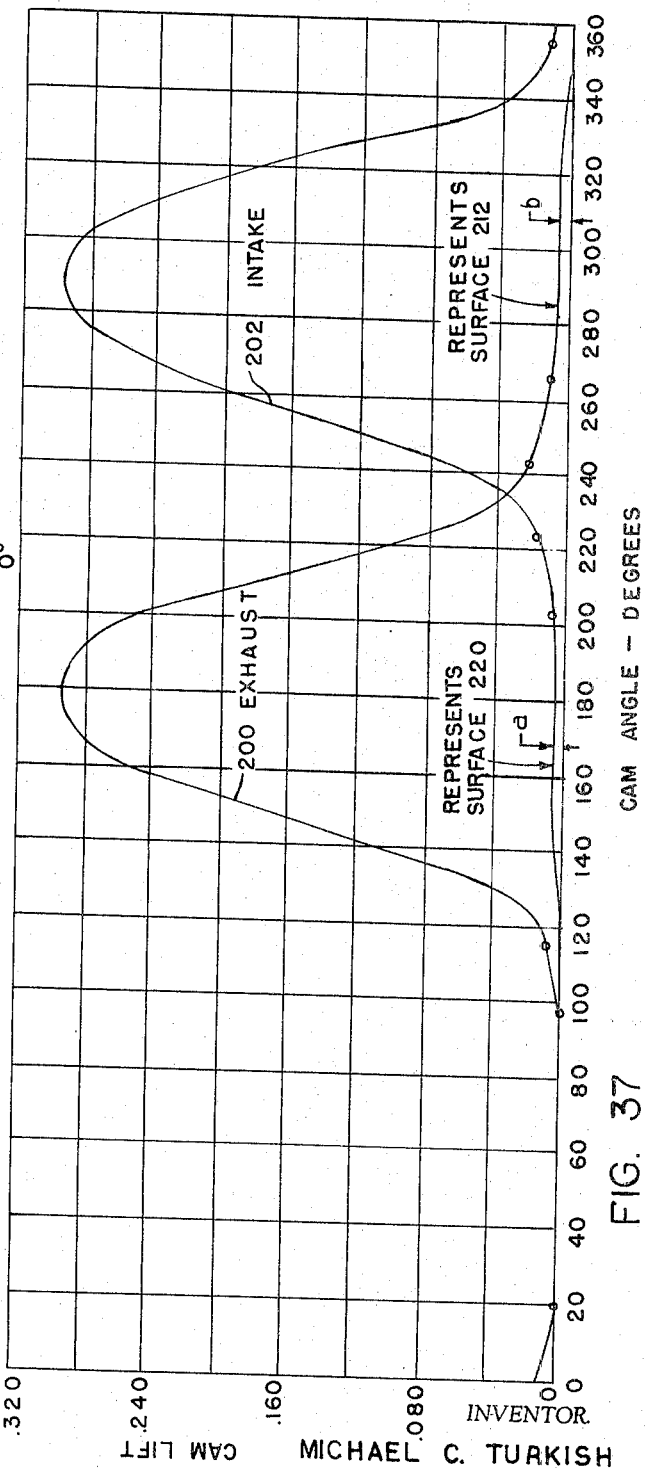

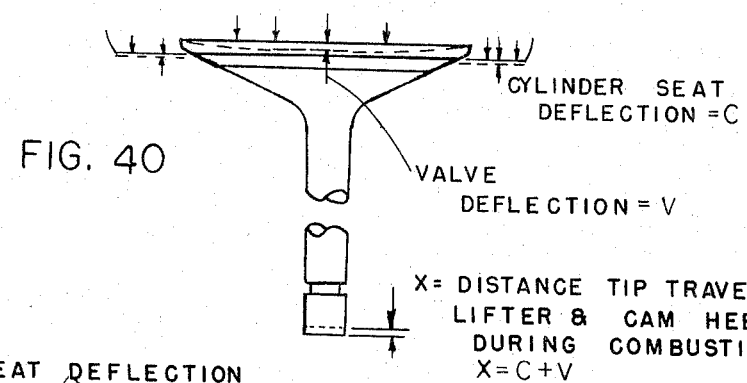
FIG. 40
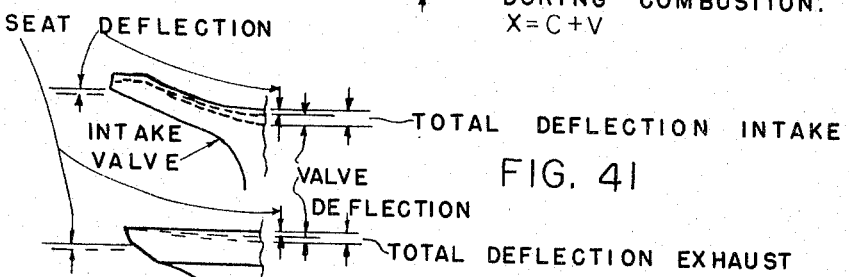
FIG. 41
FIG. 42
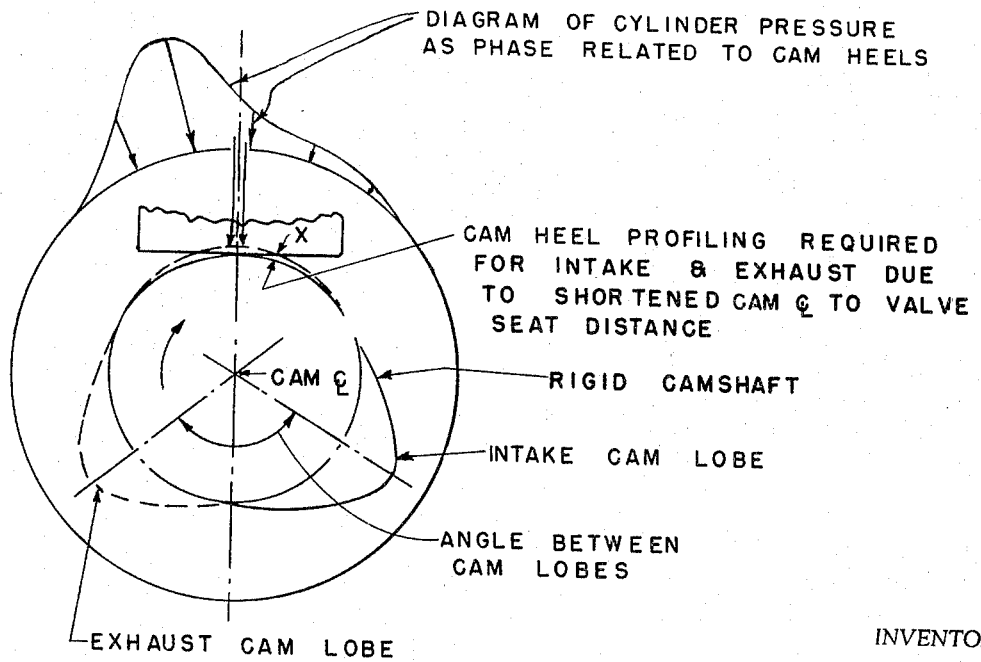
FIG. 43

May 2, 1967  M. C. TURKISH  3,316,890
CAMSHAFT FOR INTERNAL COMBUSTION ENGINE VALVE GEAR
Filed Sept. 12, 1966  13 Sheets-Sheet 11

SOLUTION: SUITABLY PROFILE THE CAM HEELS AS SHOWN ON THE FOLLOWING GRAPH. CAM HEELS TO HAVE DEPRESSED REGION WHERE LIFTER CONTACTS HEEL DURING COMBUSTION INTERVAL.

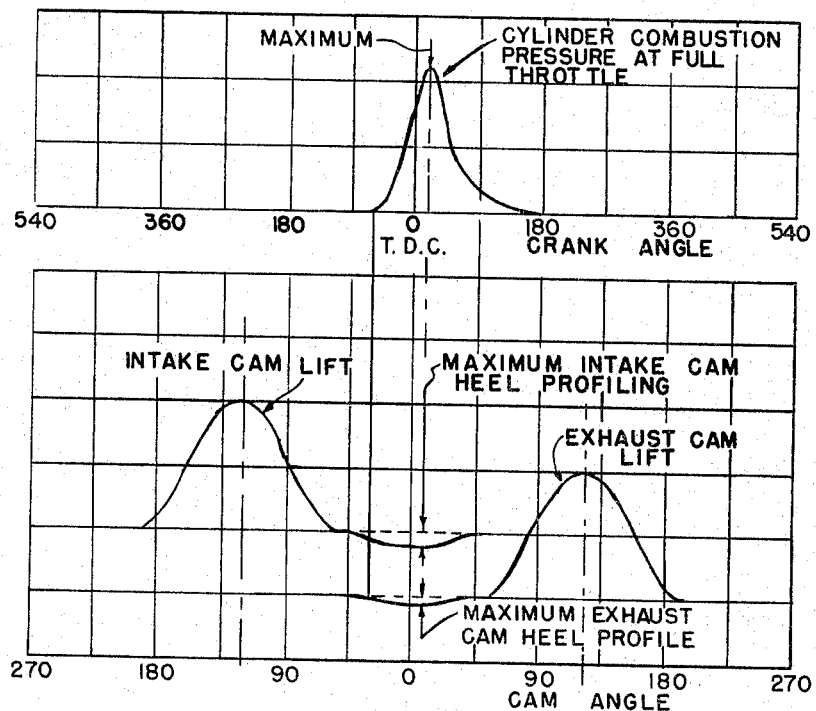

NOTE: CAM HEEL PROFILE SHAPE & AMOUNT RELATED TO
1. CYLINDER PRESSURE AT MAXIMUM COMBUSTION PRESSURE;
2. CYLINDER HEAD & SEAT DEFLECTIONS;
3. INTAKE & EXHAUST VALVE HEAD DEFLECTIONS;
4. IN SUMMARY: TOTAL VARIATION (SHORTENING OR LENGTHENING) OF THE DISTANCE FROM SEAT IN CYLINDER HEAD TO CAMSHAFT CENTERLINE.

FIG. 44

INVENTOR.
MICHAEL C. TURKISH
BY
*Liagno & Laddy*
ATTORNEYS

May 2, 1967     M. C. TURKISH     3,316,890
CAMSHAFT FOR INTERNAL COMBUSTION ENGINE VALVE GEAR
Filed Sept. 12, 1966     13 Sheets-Sheet 12
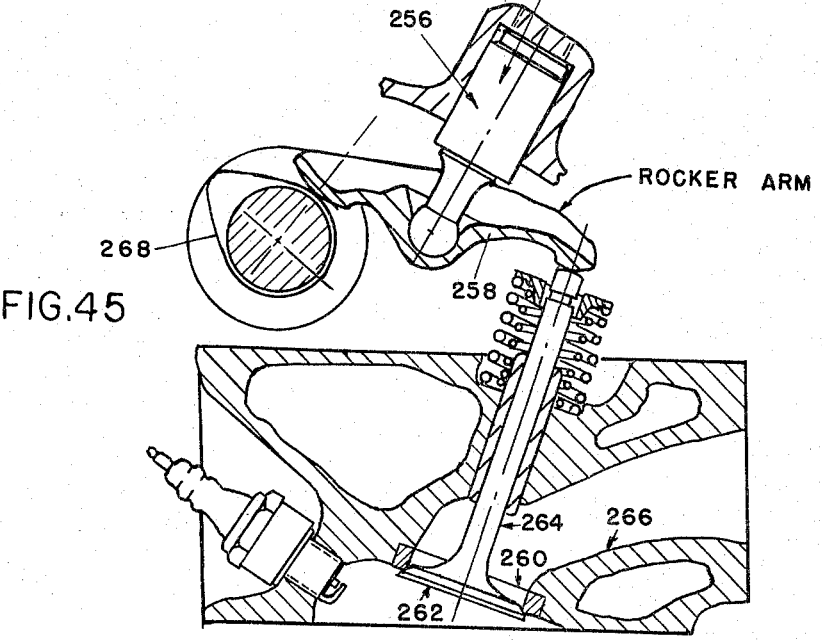
FIG.45
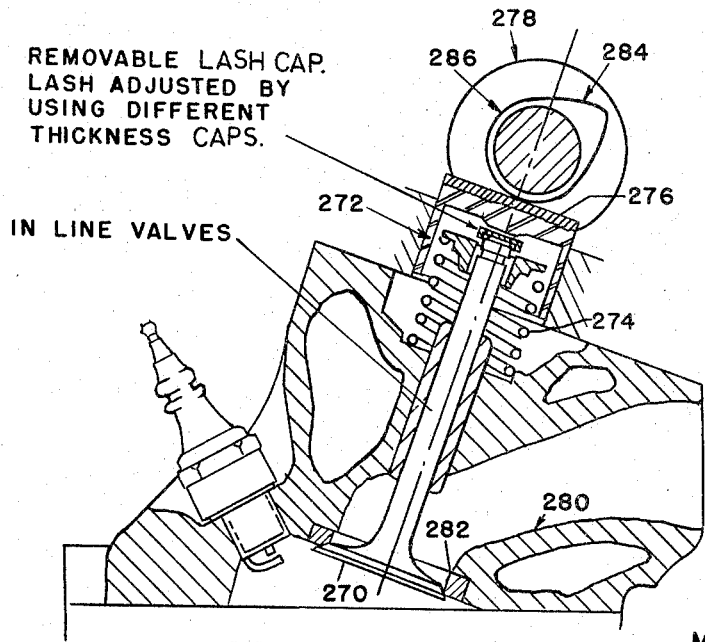
FIG.46    DIRECT ACTING TAPPET ON OVERHEAD CAMSHAFT
INVENTOR.
MICHAEL C. TURKISH
BY
ATTORNEYS

United States Patent Office 3,316,890
Patented May 2, 1967

3,316,890
CAMSHAFT FOR INTERNAL COMBUSTION ENGINE VALVE GEAR
Michael C. Turkish, Lyndhurst, Ohio, assignor to Eaton Yale & Towne Inc., Cleveland, Ohio, a corporation of Ohio
Filed Sept. 12, 1966, Ser. No. 578,528
20 Claims. (Cl. 123—90)

This invention relates to valve gear systems for internal combustion engines; and, more particularly, to camshafts for internal combustion engines.

Still more particularly, this invention relates to cam profiles that minimize valve forcing phenomena, thereby overcoming valve burning and valve seat sinking resulting from lifter compensations produced by camshaft deflections due to valve spring loadings on adjacent cam lobes.

Also more particularly, this invention relates to cam profiles that eliminate abnormal wear on valve lifters, including rocker arms used as such, produced by deflections of yieldable portions of valve gear in rigid camshaft engines.

This application is a continuation-in-part of copending application Ser. No. 452,669, filed May 3, 1965, and now Patent 3,272,189 dated Sept. 13, 1966.

The problem

In any internal combustion engine, precise valve openings and closings are necessary in order to provide proper engine performance and maintain long valve life.

The valves must open and close at exact intervals and must not crack open prematurely or remain cracked open after the proper closing time. If this happens to an exhaust valve, it will quickly burn and its valve seat will sink as the hot burning gases sweep past. Also, time for heat dissipation from the valve head to the valve seat is decreased. If this happens to an intake valve, it will cause idle roughness, impaired fuel economy and diminished valve life because of the disturbance of the precise intake timing event.

Individual cams are provided in an internal combustion engine to impart the properly timed motion to the various intake and exhaust valves. These cams are made part of an integral camshaft which is provided with suitable journals for rotation in closely fitted bearings. The camshaft is geared to the crankshaft to provide synchronous and properly phased rotation.

Since engine performance is dependent upon valve lift, proper event timing, event length and shape of the lift curve, these factors are generally compromised to give the most desirable high speed performance and still retain reasonably good engine idling qualities. A cam lobe profile is designed to provide the proper valve lift motion with due consideration being given to the various parameters of lift, velocity and acceleration. Opening and closing ramps are also provided at the beginning and end of the cam lobe profile to open the valve without impact, to seat the valve slowly to prevent bounce, and to eliminate valve seating noise.

A most important component of the cam is the base circle. This has been treated by the prior art as a non-functional component which merely permits the valve to remain closed for an appropriate interval. Previously, there has been no function in this portion of the cam to account for camshaft deflections. Thus, in the prior art, this portion of the cam has been referred to as a base circle portion because it had a uniform radius throughout its length.

By employing a base circle, it is theoretically possible to add a self-compensating lifter to remove the clearance that normally appears in a valve gear under the conditions of a theoretically rigid camshaft and valve gear components, including the valve head and the valve seat portion of the engine head. However, the self-compensating feature causes trouble when camshaft deflections enter the picture.

Camshaft deflections can produce interactions between adjacent valves and cause improper opening. As mentioned above, valve burning and valve seat sinking are the result on exhaust valves. Idle roughness and other malfunctions are the result on intake valves.

In many instances, it is not economically desirable to produce an absolutely rigid camshaft that is free of deflections at all engine speeds. To do so requires a journal adjacent to each cam. Even with an expensive, rigid camshaft construction, valve gear bounce at high speed operations can still be encountered.

Accordingly, in production camshafts, it is one common practice to position a plurality of cams between a pair of spaced journals. A specific example is a typical production camshaft for an in-line six-cylinder engine having four cams between journals. Thus, two central cams are located side-by-side at mid-span and the two end cams are located adjacent to the journals. In this situation, the cams often produce mechanical interactions with one another as the result of camshaft deflections produced by the valve spring loadings on adjacent cam lobes.

Particularly in engines utilizing hydraulic valve lifters, improper valve closing has been encountered at both low and moderate engine speeds. The hydraulic lifter is employed in a valve gear system to remove automatically any existing clearance appearing during the base circle interval. This, theoretically, serves to produce a lash-free system so that when the cam lobe rotates to the position of causing the valve to lift again, the valve immediately follows the cam lobe without any undue lag or impact. However, the existence of mechanical interaction between adjacent cams, due to camshaft deflections, produces the phenomenon of hydraulic lifter fill-up which causes undesirable compensation of the lifters. This results in the valves being forced just off of their seats during certain portions of their normal valve closed intervals.

Undesirable hydraulic lifter compensation occurs during a part of the base circle interval, in instances where camshaft deflections result from the loading of the adjacent cam lobes. Depending upon the angular relationship between the loaded cam lobes and the cam which has the hydraulic lifter on its base circle, some forcing of a particular valve from its seat may be experienced.

This problem is illustrated in FIGURES 1-8 wherein consideration is given to low and medium speeds of operation. Undesirable conditions occur when high load valve springs are used and when the camshaft has a measurable amount of flexure due to the high loadings caused by the springs.

Thus, as shown in FIGURES 1-3, a valve spring load $P_2$ imposed on the peak of one cam lobe, intake cam I for example, in its valve-open position, produces a maximum deflection of that cam. But, this is not objectionable since that valve is open and the lifter is solidly loaded. The deflection is shown greatly exaggerated between the dotted and solid lines. However, this deflection is transmitted by the camshaft to an adjacent cam, exhaust cam E for example, which is in a valve-closed position. This causes the valve-closed position cam E to drop slightly, tending to move the base circle away from the face of the hydraulic lifter.

$S_1$ is the deflection of the exhaust cam. Since the exhaust cam E is closed, the deflection $S_1$ imposes no harm on the exhaust valve, merely permitting the spring of the exhaust valve to hold it in a closed position. However, the lifter senses the clearance so produced and fills up to remove the clearance $S_1$. Thus, contact is maintained between the face of the lifter and the base circle of the cam E.

After a hydraulic lifter has compensated for the clearance $S_1$ introduced between the lifter face and cam E, FIGURE 4, due to the deflection caused by the loading of the cam lobe I, it will remain filled; that is, undesirably compensated upon further rotation of the camshaft when the pre-existing peak spring load on the first cam lobe I is relieved and the camshaft reverts from the deflected condition to the straight, undeflected condition. Since the hydraulic lifter on the adjacent cam E has compensated, it will force its valve slightly off its seat during a part of the base circle interval at the instant when the camshaft reverts to the undeflected condition.

This is the precise point at which the trouble arises. Thus, in FIGURES 5 and 6, the camshaft has rotated clockwise by approximately 120° to the position where both valves are theoretically closed. As shown in FIGURE 7, the intake valve is closed and the deflection has been removed as indicated by the absence of any dotted line.

However, as shown in FIGURE 8, the prior undesired lifter compensation $S_1$ is still present for the exhaust valve gear. This causes the exhaust valve to be slightly lifted off its seat as the lifter rides the base circle prior to the opening side of the cam lobe. At this position, the exhaust valve should be fully closed instead of encountering the slightly open condition. This condition causes improper valve functioning.

This undesirable lifter compensation may occur during any part of the base circle interval and will depend upon the amount of greatest camshaft deflection.

If the greatest amount of camshaft deflection occurs in the beginning part of the valve-closed base circle interval, undesired lifter compensation will occur there; that is, just following the normal lift cycle. Then, however, in the latter part of the base circle interval, the deflection disappears; but, the lifter remains undesirably compensated. This causes the valve to be forced open during the latter part of the base circle interval, or just prior to its normal lift cycle.

Similarly, if the greatest amount of deflection occurs in the latter part of the valve-closed base circle interval, undesired lifter compensation will occur there; just prior to the normal lift cycle. Then, however, after the valve lift cycle is completed, the deflection disappears; but, the lifter remains undesirably compensated. This causes the valve to be forced open during the early portion of the valve-closed base circle interval, just after the valve lift cycle.

The very limited amount of lifter leak-down that occurs during each cycle, when the lifter is loaded on the lift portion of the cam lobe, is only one thousandth of an inch (.001") or less. This is insufficient to offset the effect of lifter compensation occuring when deflections exceed this amount. High rates of lifter leakage, by use of large clearances or low oil viscosities, will allow a greater tolerance to camshaft circle deflections. But, this is not a satisfactory solution since it results in noisy and erratic valve seating.

Self-adjusting mechanical lifters operating with zero clearance are similarly sensitive to this problem of camshaft deflection. The same problems will also occur with these mechanical self-compensating devices as are encountered with hydraulic lifters where camshaft deflections cause valves to be improperly forced off of their seats.

Mechanical tappets, which have no self-adjusting means and have a reasonably large appropriate clearance provided within the valve gear, are not so sensitive to this problem of camshaft deflections. Positive valve closing can be assured when the proper valve gear clearance is provided. However, if the valve gear is designed to operate with very low clearance and the camshaft is capable of large deflections, in excess of the clearance provided, then the forcing of the valves off of their seats, as encountered with hydraulic lifters, can occur.

Thus, at low and moderate engine speeds, valve malfunctions are often produced by mechanical interactions of adjacent cams located between the same pair of journals. Spring loads imposed on the cam lobes are effective to deflect the camshaft and thus produce the cam base circle valve-forcing phenomena, caused by lifter compensations occuring during these deflections.

Therefore, a substantial and important advancement to the art would be provided by an improved cam profile that would counteract undesired hydraulic lifter compensation during the base circle interval to alleviate improper opening of valves of internal combustion engines using hydraulic lifters.

Further, an important advancement to the art would be provided by a novel cam profile that would counteract undesired lifter compensation produced by camshaft deflection to alleviate improper opening of valves of internal combustion engines using self-adjusting mechanical or similar lifters.

Still further, an important advancement to the art would be provided by a novel and improved cam profile operating with valve gear set to low clearances, that would alleviate improper opening of valves of internal combustion engines using mechanical tappets.

*Further elements of the problem*

In addition to the aspect of camshaft deflection which has been analyzed in detail above, there are elements of the valve gear, as distinguished from the camshaft, which can deflect at engine operating speeds to produce malfunctions. This presumes that the camshaft can be manufactured in a manner to be rigid so that the problems encountered with camshaft deflections are theoretically not present.

For the present analysis, this then means that other elements of the valve gear may deflect. Thus, a rather large valve head, as used in modern engines to assure free breathing, is in the nature of a thin shell that will bow under combustion pressures and deflect the valve stem axially as in a direction away from the base of the valve head. Also, it is a recognized phenomenon that portions of the cylinder head above the combustion zone, namely the valve seat and surrounding portions, will deflect under combustion pressures.

Thus, deformations of the valve and/or deflections of the cylinder head (engine which includes the valve seat) impose a loading on the valve gear. These deflections produce an effective shortening of the valve seat to cam distance. Essentially then, the cam base circle becomes loaded during a substantial portion of its interval. This causes the oil film to be scrubbed away and results in localized intensive wear on the follower.

Hydraulic lifters must compensate for deflections of these yieldable portions of the valve gear in order to prevent abnormal wear on the lifters. However, in the case of hydraulic lifters, this distortion phenonmenon shortens the time for the lifters to compensate. The result is not only noise—but, more importantly, localized wear on the follower where the base circle of the cam profile is forced into scrubbing contact with the follower—and scrubs away the oil film. The resultant wear disturbs the whole valve action and requires engine rebuilding to alleviate the damage and restore the engine to proper operating condition. Such restoration, however, is short lived and the process repeats itself. Therefore, the cure is not permanent.

Accordingly, a still further substantial advancement to the art would be provided by an improved cam profile that would prevent undesired loading on the valve gear to alleviate abnormal follower wear.

Objects, therefore, are to provide novel cam profiles that are effective to minimize valve forcing phenomena produced by camshaft deflections.

Further objects are to provide novel cam profiles that are effective to eliminate abnormal wear on valve follower surfaces produced by deflections of yieldable portions of the valve gear in rigid camshaft engines.

FIGURE 1 is a schematic elevational view of a portion of a camshaft having two cams located within a bearing span, illustrating the problem that has been solved in accordance with the present invention;

FIGURE 2 is a schematic sectional view taken along the line 2—2 of FIGURE 1;

FIGURE 3 is a schematic sectional view taken along the line 3—3 of FIGURE 1;

FIGURE 4 is a schematic sectional view taken along the line 4—4 of FIGURE 1;

FIGURE 5 is a view similar to FIGURE 1 but showing the camshaft in a partially rotated position beyond the FIGURE 1 position, where both valves should now be closed;

FIGURE 6 is a schematic view taken along the line 6—6 of FIGURE 5;

FIGURE 7 is a schematic view taken along the line 7—7 of FIGURE 5;

FIGURE 8 is a schematic view taken along the line 8—8 of FIGURE 5;

FIGURE 9 is a schematic elevational view, partly in section, of a portion of a camshaft wherein four cams are located within a bearing span, to provide an environment for discussion of the invention;

FIGURE 10 is a schematic end-elevational view, taken along the line 10—10 of FIGURE 9, illustrating conventional cam profiles;

FIGURE 11 is a reproduction of an actual oscillogram of a load-time or load-angle diagram, showing the presence of exhaust valve forcing while on the base circle, produced by the conventional cam profiles of FIGURE 10;

FIGURE 12 is a schematic view illustrating one aspect of the present invention;

FIGURE 13 is a reproduction of an actual oscillogram of a load-time or load-angle diagram, showing the absence of exhaust valve forcing while on the novel functional heel resulting from use of the invention as shown in FIGURE 12;

FIGURE 14 is a composite oscillogram, made by superimposing the small circled portions of FIGURES 11 and 13, to illustrate more clearly the improvement obtained by use of the present invention;

FIGURE 15 is an illustration of a segment of a theoretically rigid and undeflected camshaft having two cams within a bearing span, for purposes of further illustrating the problem;

FIGURE 15a is a schematic view taken along the line 15a—15a of FIGURE 15;

Figure 21:
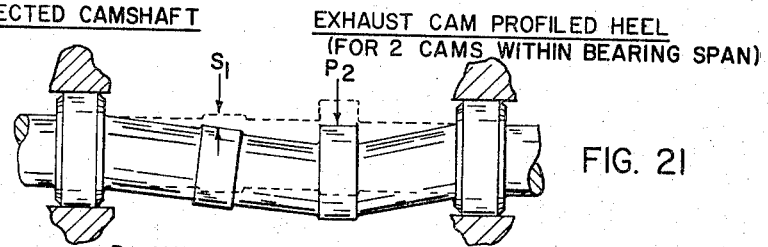
Figure 22:
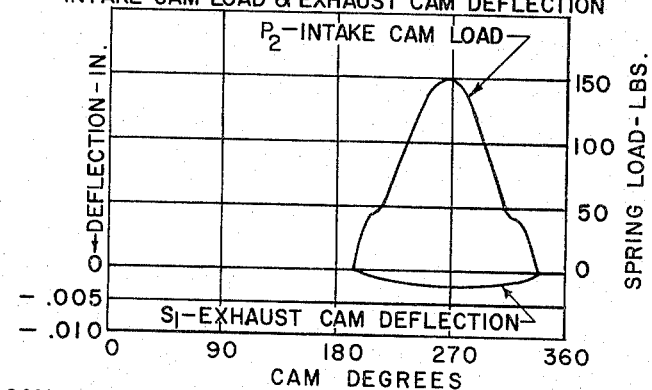
Figure 23:
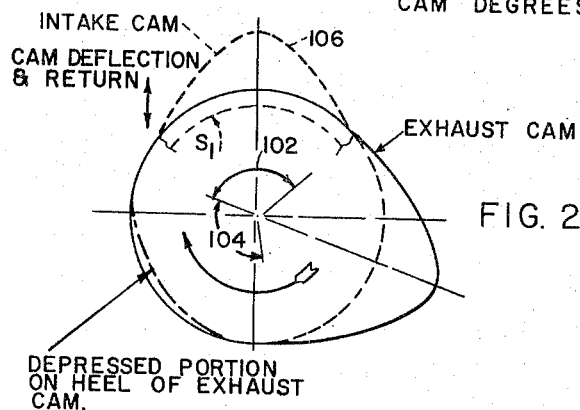
Figure 24:
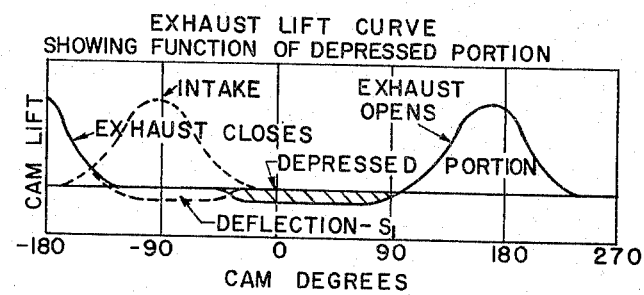
Figure 38:
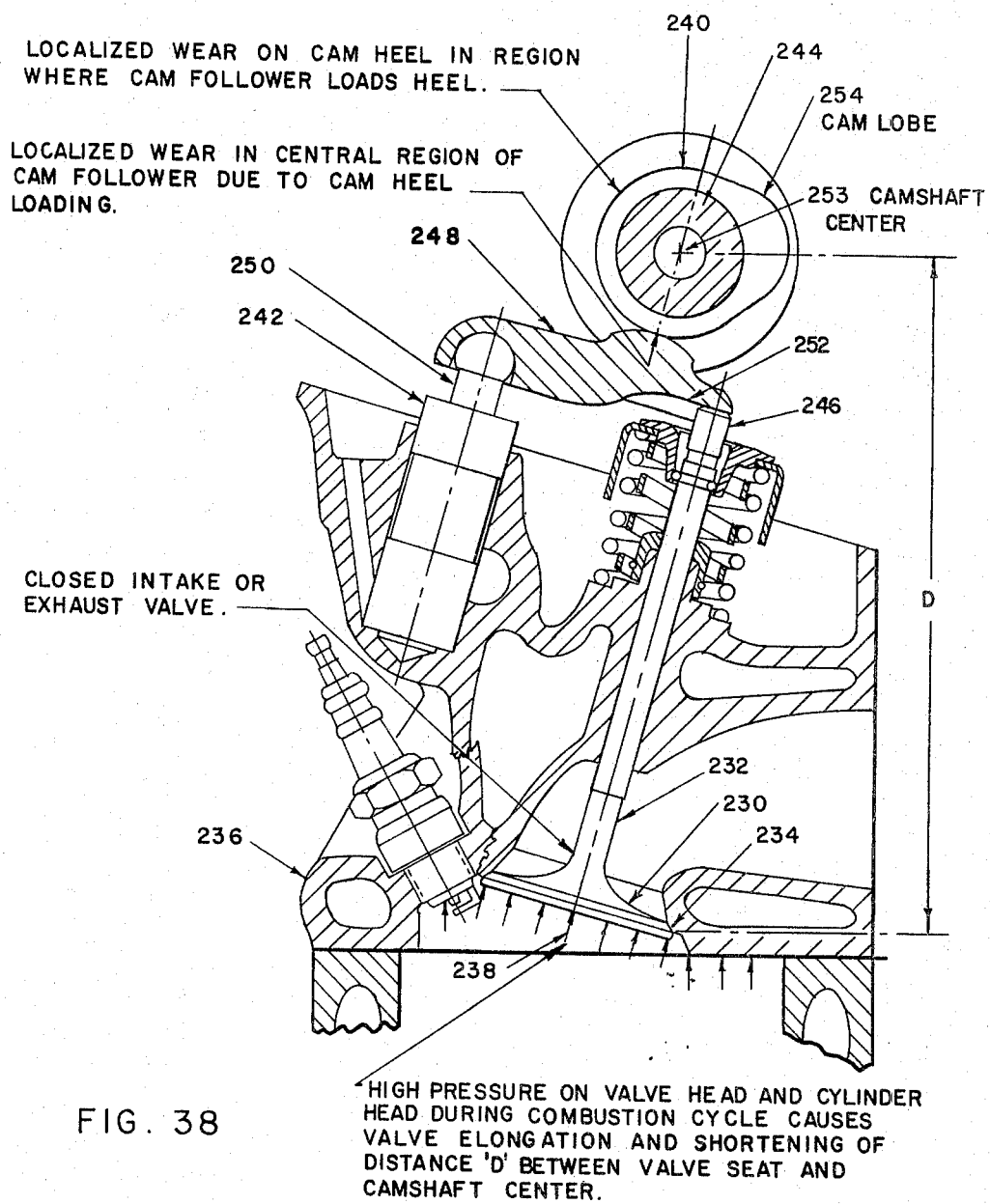
Figure 39:
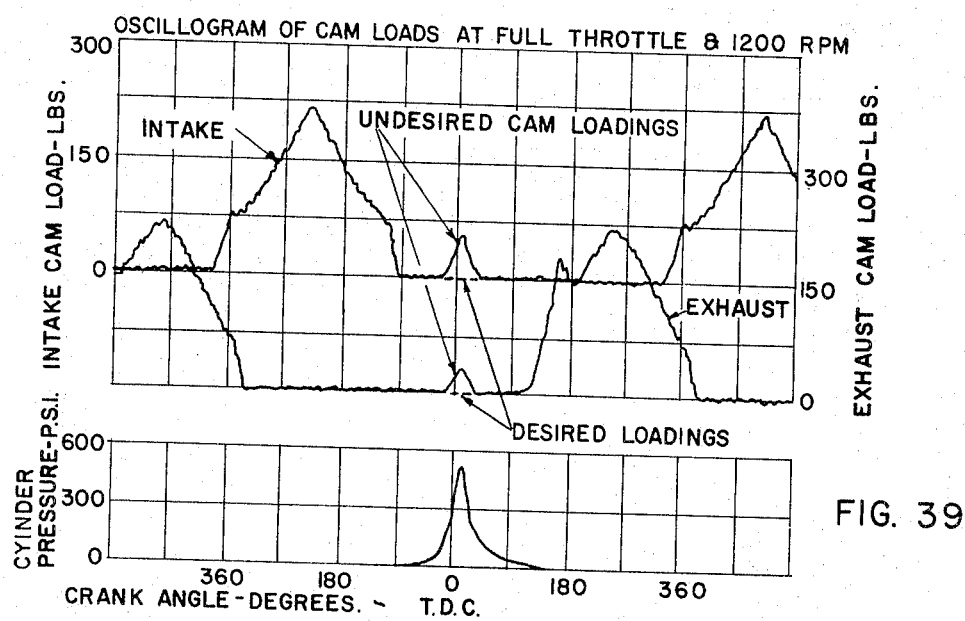
Figure 39A:
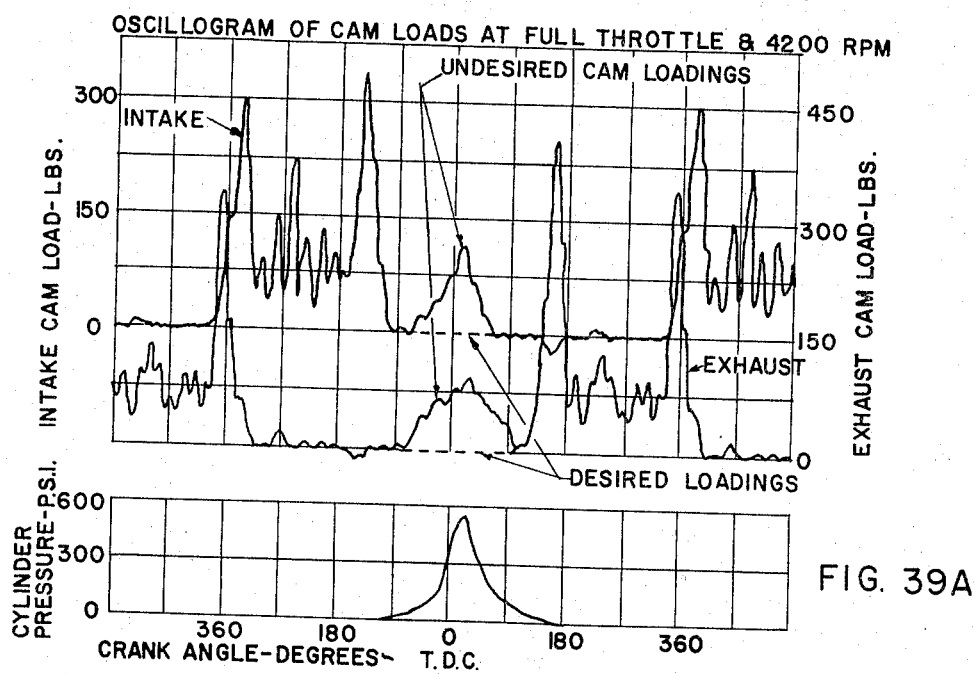
Figure 47:
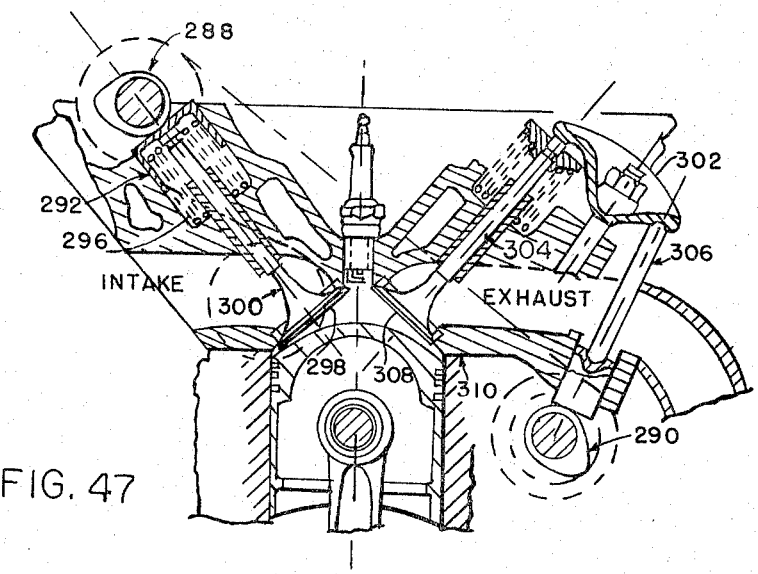
Figure 48:
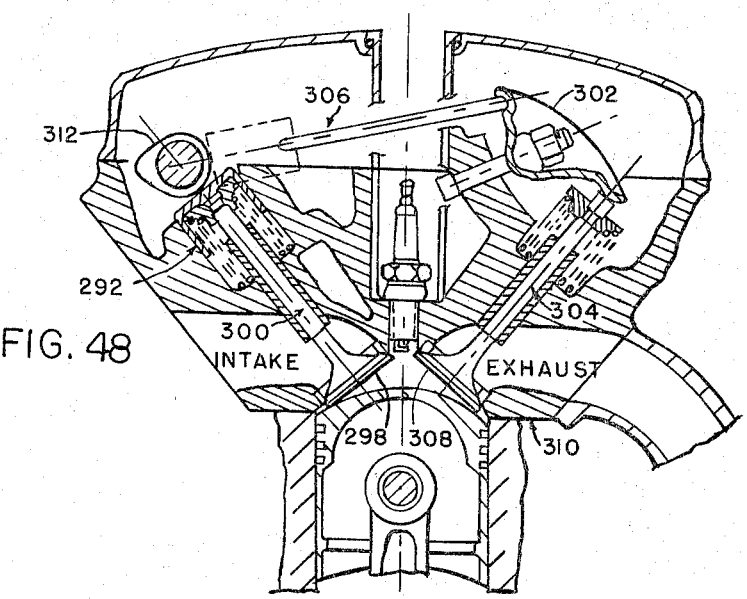

FIGURE 16 includes a graph illustrating normal lift curves for exhaust and intake cams of the undeflected camshaft of FIGURE 15, but with deflection shown by the dotted line;

FIGURE 17 illustrates the camshaft deflection encountered when two cams are located within a bearing span, wherein spring load on the exhaust cam lobe produces deflection of the intake cams;

FIGURE 18 is a graph showing intake cam deflection as related to exhaust cam lobe loading;

FIGURE 19 illustrates the principle of the invention as applied to profiling the heel of the intake cam by depressing a portion of the heel in its early portion;

FIGURE 20 is a graph showing the function of the novel profiled heel of FIGURE 19 to prevent improper forcing of the intake valve off of its seat as a result of camshaft deflection, as illustrated in FIGURE 17;

FIGURE 21 illustrates the camshaft deflection encountered with two cams within a bearing span, wherein valve spring loading on the intake cam lobe produces deflection of the exhaust cam;

FIGURE 22 is a graph showing exhaust cam deflection as related to intake cam loading;

FIGURE 23 illustrates the principle of the invention as applied to profiling the heel of the exhaust cam by depressing a portion of the heel in its latter portion;

FIGURE 24 is a graph showing the function of the novel heel profile of FIGURE 23 to prevent improper forcing of the exhaust valve as the result of camshaft deflection, as illustrated in FIGURE 21;

FIGURE 25 is an illustration of three cams within a bearing span as used in an opposed-piston engine, for purposes of showing exhaust cam deflection;

FIGURE 26 is a schematic view taken along the line 26—26 of FIGURE 25;

FIGURE 27 is a graph showing deflections of two exhaust cams as the result of valve spring loadings on the intake cam lobes positioned therebetween, as in FIGURE 25;

FIGURE 28 illustrates the principle of the present invention as applied to profiling the heel of the exhaust cams of FIGURE 25;

FIGURE 29 is a graph showing the function of profiling the heels of both exhaust cams in FIGURE 25, in accordance with FIGURE 28, to prevent improper forcing of the exhaust valves of FIGURE 25;

FIGURE 30 is an illustration similar to FIGURE 25, of three cams within a bearing span as used in an opposed-piston engine, for purposes of showing opposed intake cam deflections;

FIGURE 31 is a schematic view taken along the line 31—31 of FIGURE 30;

FIGURE 32 is a graph showing deflections of the intake cam of FIGURE 30, as the result of valve spring loadings on the intake cam lobe and on the two adjacent exhaust cam lobes;

FIGURE 33 illustrates the principle of the invention as applied to profiling the heel of the intake cam of FIGURE 30;

FIGURE 34 is a graph showing the function of profiling the heel of the intake cam in accordance with FIGURE 33;

FIGURE 35 is a sectional view of a camshaft illustrating the profile of an exhaust cam wherein undesired lifter compensation is prevented in accordance with the principles of the invention, by elevating a portion of the novel profiled heel above a theoretical base circle radius to provide a function equivalent to the previous showings wherein a portion of the heel was contoured to a level below a theoretical base circle periphery;

FIGURE 36 is a sectional view similar to FIGURE 35, but showing an adjacent intake cam profile, wherein undesired lifter compensation is prevented in accordance with the principles of the invention, by elevating a portion of the novel profiled heel above a theoretical base circle radius, to provide a function equivalent to the previous showings wherein a portion of the heel was contoured to a level below a theoretical base circle periphery;

FIGURE 37 is a graph illustrating typical exhaust and intake cam lift curves produced by the novel profiled heel cams of FIGURES 35 and 36, for use with a deflected camshaft as encountered in actual engine operation;

FIGURE 38 is a fragmentary sectional view of a production six-cylinder in-line engine having a rigid overhead camshaft, wherein combustion pressures produce valve gear distortions, producing malfunctions;

FIGURE 39 is a reproduction of a typical oscillogram, showing the presence of intake and exhaust valve gear loadings, produced by conventional cam profiles in the engine of FIGURE 38 when operated at low speed and open throttle;

FIGURE 39A is a reproduction of a typical oscillogram similar to FIGURE 39 except that the engine is operated at high speed and open throttle;

FIGURE 40 is a schematic view illustrating the amount of valve seat deflection, of the engine of FIGURE 38, that is taken into consideration in arriving at the profiling, by invention, as shown in FIGURE 43;

FIGURE 41 is a schematic view illustrating the combined amount of valve seat and intake valve head deflection, of the engine of FIGURE 38, that is taken into consideration in arriving at the profiling, by invention, as shown in FIGURE 43;

FIGURE 42 is a schematic view illustrating the combined amount of valve seat and exhaust valve head deflection, of the engine of FIGURE 38, that is taken into consideration in arriving at the profiling, by invention, as shown in FIGURE 43;

FIGURE 43 is a schematic view showing the cam heel profiling as applied to the engine of FIGURE 38, and illustrating the manner in which the profiling is phase related to cylinder combustion pressure;

FIGURE 44 is a graph illustrating the effect of application of the cam base circle segment profiling, by invention, to the engine of FIGURE 38, to produce improved operation;

FIGURE 45 is an illustration of an engine valve gear, having a rigid overhead camshaft and using either a mechanical or hydraulic lash adjuster, in the nature of the engine of FIGURE 38, to which the principles of the invention are applicable;

FIGURE 46 is an illustration of an engine valve gear having a rigid overhead camshaft and using a direct mechanical tappet, providing position clearance during the valve-closed interval to which the principles of the invention are applicable;

FIGURE 47 is an illustration of an engine valve gear, using a rigid overhead camshaft with mechanical tappets for the intake valves and a rigid block-mounted camshaft with hydraulic lifters and rocker arms for the exhaust cams, to which the principles of the invention are applicable; and, FIGURE 48 is an illustration of an alternate arrangement of the engine of FIGURE 47, wherein a single, rigid, overhead camshaft is used for both sets of valves, mechanical tappets being used for the intake valves, and hydraulic lifters and rocker arms for the exhaust valves, to which the principles of the invention apply.

The terminology "profiling the heel" refers to providing a profile for the heel of the cam which is essentially nonuniform radially as distinguished from a base circle of the prior art. In one embodiment of the invention, this is effected by depressing selected regions of the heel to counteract camshaft deflections. In an alternate embodiment, this profile can be described as elevating selected regions of the heel to counteract camshaft deflections. In each case, the precise end result of the profiled heel is the same. Therefore, the terminology "profiled heel" is adhered to and encompasses both embodiments.

Actually, this invention was carried out by modifying existing cams having base circles of uniform radii, employing the first embodiment to prove the merits of the invention in actual engine tests. This shows that within the scope of the invention, profiled heels can be generated per se, or by undercutting conventional base circles in either the same or separate grinding operations.

Indeed, the invention can be advantageously applied to a cam design by specifying the lift figures to five decimal places, as in the usual practice, for each degree of cam rotation throughout the entire 360°. In this manner, both the heel profile and the entire cam lobe profile are specified as one continuous cam lift curve. In this manner all vagueness of terminology is eliminated and the true purpose of this invention can be precisely and systematically applied.

*The invention; FIGURES 9-14*

In accordance with the present invention, instead of a base circle, a novel, profiled heel is employed. Thus, lifter compensation which occurs during camshaft deflection is subsequently counteracted and as a result the value is kept properly closed during the heel portion of cam operation.

In FIGURE 9, there is illustrated a portion of a camshaft 50. Bearings 52 and 54 support the camshaft at spaced intervals along its length, establishing the bearing span. The bearings 52 and 54 receive journals 56 and 58 respectively. Within the bearing span are four cams 60, 62, 64 and 66. Engaging each of the cams 60, 62, 64 and 66 are lifters 68. Each lifter is operably connected to a valve.

The element 70 is a fuel pump eccentric frequently located centrally of a six-cylinder engine camshaft, as illustrated.

The camshaft illustrated is actually used with an overhead valve, six-cylinder engine. In this arrangement, each of the lifters 68 is operably connected to the bottom end of a pushrod that extends up along the side of the engine to engage one end of a rocker arm journaled on a rocker shaft, bolted to the top side of the head of the engine. The other end of each rocker arm engages the end of a valve stem. Each valve stem in turn carries a valve spring, not shown, held captive between the top side of the engine head and a valve spring retaining washer attached to a groove on the valve stem. The valve spring thus is effective to continuously bias the valve toward a closed position, in turn forcing the rocker arm in a manner to force a lifter 68 downwardly to contact its cam, as shown in FIGURE 9.

The lifters 68 are self-adjusting hydraulic lifters and, theoretically, maintain constant contact with the cams so that there is no clearance or lash in the valve gear to produce noise, vibration and impact shock loads.

While the foregoing description has related to valve-in-head engines, the same principle applies to valve-in-block engines.

In FIGURE 10, a conventional intake cam 60, for cylinder #3, is shown as having a true radius 72 as the base circle on the valve-closed portion of the cam. Typical of the prior art, this is nonfunctional. The cam also has a lobe 74. Typical of the prior art, this is the only functional portion.

In the condition of FIGURE 10, which is the same as shown in FIGURE 9, the lobe 74, having spring-loaded lifter 68 on its peak, is that of the intake cam 60. In this condition, the intake valve of cylinder #3 is open. This imparts maximum spring load on the camshaft at that point and causes a downward camshaft deflection similar to that illustrated by FIGURE 1. This deflection at cam 60 is also imparted to the adjacent cam 62 which, in this instance, is the exhaust cam for cylinder #3.

Now visualize that the camshaft rotates as indicated by arrow 76. The lifter 68 rides down the lobe 74 in the arrow direction 78 so that the valve seats when the base circle 72 reaches the top side of the camshaft. The deflection caused by intake cam 60 decreases as the spring load is reduced, while the valve of cam 60 approaches its seat; and then, the deflecting load source finally is eliminated as the valve becomes seated. Another source of deflection producing loading occurs as exhaust cam 64 operates its lifter and valve. In similar manner, the valve spring load acting on cam 64 produces a downward deflection to the camshaft even after cam 60 rotates beyond the point where it causes no deflection. Now as lifter 68 rides down the lobe 75 of cam 64, the deflection caused by this cam decreases as the spring load is reduced. During this second unloading of the camshaft by cam 64, the camshaft also returns toward its normal undeflected condition.

Now consider the action of cam 62 in FIGURE 9, which is adjacent to both cams 60 and 64.

If, in the angular sector 80 of the base circle, the cam 62 is deflected downwardly by valve spring loads on cams 60 and 64, as has just been explained, the lifter for cam 62 will undesirably compensate.

Then, as the angular sector 82 of the base circle is brought around to engaging position with the lifter face for cam 62, the previous compensation, being present at the instant when the camshaft deflection is relieved, causes forcing of the exhaust valve, being operated by cam 62, and the valve is cracked off its seat. This results in burning of the exhaust valve and sinking of the valve seat due to the leakage of the hot burning gases past the valve and valve seat.

FIGURE 11 is a reproduction of an actual oscillogram showing the presence of exhaust valve forcing by cam 62 of cylinder #3, as shown in FIGURES 9 and 10. This results from the sudden disappearance of the prior deflection when the lifter became filled up.

*The invention applied*

In accordance with the present invention, a novel profiled heel is employed. FIGURE 12 illustrates the manner in which the angular sector 82 of the heel is profiled by depressing its surface to the maximum depth 83 to nullify the forcing condition just described.

FIGURE 13 is a reproduction of an actual oscillogram taken during engine operation, using a novel profiled cam heel as illustrated in FIGURE 12.

FIGURE 14 more vividly illustrates how the base circle forcing problem has been solved in accordance with the present invention. The upper curve represents the forcing from FIGURE 11, the prior art, imposed upon a similar portion of the curve of FIGURE 13, representing the invention. The improvement of the invention is represented by a horizontal line, indicating the absence of exhaust valve forcing.

The foregoing description provides an illustration of the principle of the present invention and illustrates the manner in which the problems caused by camshaft deflections are overcome. Thus, mechanical interaction of adjacent valves, produced by camshaft deflections caused by loads imposed by operating adjacent cam lobes, are counteracted by the invention.

*The intake cam profiled heel; FIGURES 15–20 two cams within bearing span*

In FIGURE 15, there is shown a theoretically rigid camshaft. This is designated 84, and is illustrated as having two cams within the bearing span as distinguished from FIGURE 9, which had four cams. Here, the exhaust cam is designated 86 and the intake cam 88. The spaced bearings are designated 90 and the journals 92.

FIGURE 16 includes a graph of the lift curves for an undeflected camshaft, as illustrated in FIGURE 15. As regards the exhaust cam, there is a positive rise from zero lift in approximately 70° of rotation, passing through a maximum slightly before 180° and then back to exactly zero at slightly before 270°. Similarly, there is a uniformly smooth curve for the intake cam, showing positive rise from exactly zero lift at slightly after 180°, to a maximum at 270°, returning to exactly zero at approximately 360°. It will be observed that at no time during the closed period is there any indication of anything other than exactly zero lift. Thus, the valves theoretically are tightly closed during the entire base circle interval.

It can be readily understood that if there was any forcing of the intake cam due to exhaust cam lobe loading and deflection, there would be a partial intake valve opening as indicated by the dotted line 94 in FIGURE 16. This condition would result from the type of deflection shown in FIGURE 17.

Referring more particularly to FIGURE 17, there is a maximum valve spring load $P_1$ imposed on the exhaust cam 86. This produces a maximum deflection at this point. Also, it produces a deflection $S_2$ of the camshaft as far away as intake cam 88. This is shown graphically in FIGURE 18. Thus, as shown in FIGURE 18, as the exhaust cam load rises to a maximum, the intake cam deflection similarly reaches a maximum returning to zero when the exhaust cam loading has passed.

In this instance, this deflection has no effect on the exhaust valve because it is in an open position. However, there is a damaging effect on the intake valve. Thus, by reference to FIGURE 17, it is to be understood that a hydraulic lifter 68 has sensed the deflection $S_2$ of intake cam 88. Under the conditions of FIGURE 17, therefore, the lifter fills up to re-establish contact with the cam 88.

Now refer to FIGURE 19. The intake cam is actually deflected down to the dotted line position 96. The camshaft rotates in the arrow direction 76 to bring the intake cam up to an opening position. The previous, undesired compensation, which the lifter has made, is not damaging at this instant as the valve opens, since it just tends to open the valve a little further than normal. However, when the intake cam rotates further to the position where the angular sector 98 of the novel profiled heel is uppermost, the depressed portion, as shown in FIGURE 19, is effective to counteract the compensation previously made by the lifter and thus permits the valve to fully close.

As the angular sector 100, having the elevated portion of the novel profiled heel again comes around to the top side, camshaft deflection will again come into play, as by the adjacent cam 86 opening the exhaust valve, to keep the intake valve properly seated, even with the previous compensation of the lifter still existing.

The function of the depressed portion of the profiled heel is illustrated graphically in FIGURE 20. The intake valve closing period occurs from −90° to near 0°. The depressed portion in the shaded area allows the intake valve to become properly seated even though the camshaft returns to its undeflected condition during this interval. Since the camshaft remains undeflected from 0° and 90° of rotation, it is necessary to depress the heel for this full interval to counteract the lifter compensation which occurred previously when the camshaft was deflected.

On further rotation, cam 86 actuates the exhaust valve, opening at between 90° and 180°, imposing a deflection to both the exhaust and intake cams. The exhaust opening lift and the resulting deflection are shown as dotted lines in FIGURE 20. The depressed portion on the intake cam heel has now been passed and, thus, the lifter rides the elevated portion of the heel during the angular sector 100 in FIGURE 19. It is in this region that the deflection $S_2$, shown in FIGURE 17, causes the undesired lifter compensation to occur so that, on the next passing of the 0° to 90° angular sector 98, the depressed portion must again counteract lifter compensation.

*Summary*

To make sure that the reader clearly understands the problem and the solution offered by the invention, it is simply reiterated as follows. A camshaft deflection causes a hydraulic lifter, which is riding the cam heel, to fill up. Then, during the interval on the heel when the camshaft deflection is relieved, the hydraulic lifter will exert a force upon a valve to unseat it. Thus, in accordance with the invention, the heel is profiled by being depressed in the angular sector that is top side when the camshaft is undeflected so as to counteract the compensated condition of the lifter.

*The exhaust cam profiled heel; FIGURES 21–24 two cams within bearing span*

FIGURE 21 illustrates a deflected camshaft wherein the spring load $P_2$ is maximum on the intake cam lobe.

This, of course, produces a maximum deflection of the intake cam with some of that deflection being imparted to the exhaust cam as $S_1$.

By referring to FIGURE 22, the intake cam loading and exhaust cam deflection are correlated. When the intake cam load is at a maximum, the deflection is at a maximum. When there is no intake cam load, the exhaust cam deflection is zero.

In FIGURE 21, the intake cam is shown at maximum valve-open position, causing maximum valve spring force to be applied to the intake cam. This imparts deflection $S_1$ to the exhaust cam, as shown in FIGURE 23. This deflection is sensed by the hydraulic lifter for the exhaust cam when the exhaust cam has the angular sector 102 of the novel profiled heel of FIGURE 23 uppermost. As the angular sector 104 of the heel comes up, during camshaft rotation, the valve would normally be lifted off its seat as the deflection $S_1$ was relieved by the intake cam 106 passing beyond the range of the cam lobe contacting its lifter. In order to counteract lifter compensation occurring during deflection, a depressed portion is provided on the heel in the region nearest the opening side of the exhaust cam lobe. This depressed portion is located principally in the angular sector 104 as illustrated in FIGURE 23.

By referring to FIGURE 24, it will be noted that the exhaust cam closes between $-180°$ and $-90°$. At $-90°$, the intake is fully open imposing maximum spring load and, thus, deflection $S_1$ on the exhaust cam. This causes the exhaust cam to move away from the face of its lifter and the lifter compensates. As the intake closes near $0°$, the face of the previously compensated exhaust lifter then rides the depressed portion of the heel to nullify the absence of deflection and, thus, keep the exhaust valve from being forced and held at a partially open position. Thus, the exhaust valve is kept at zero lift until shortly after $90°$ where the valve opening properly starts again.

*Summary*

The prior description has been directed to two cams within a bearing span in order to clearly illustrate the problem and highlight the application of the principles of the invention thereto.

Additionally, the invention is applicable to a camshaft wherein four cams are included within a bearing span as was originally mentioned relative to FIGURE 9, representing the environment of a specific production six-cylinder engine. Problems of camshaft deflection become more complicated with a greater number of cams between bearing spans. However, the principles of application fully apply.

*The exhaust cam profiled heel for opposed-piston engines: three cams within bearing span; FIGURES 25–29*

The principles of the invention are not only applicable to in-line piston engines, but they are also applicable to opposed-piston engines, such as used in aircraft and in some present-day rear engine automobiles.

In opposed-piston engine structures of this type, it is frequently possible to permit one cam lobe to actuate two lifters located diametrically opposite each other. This eliminates the need of one cam lobe and produces a more compact engine arrangement. A portion of such a camshaft for operation with two opposed engine cylinders, is shown in FIGURE 25. Three cams are provided between the bearing span, and in this arrangement, it is to be noted that cams 122 and 124 each actuate only one lifter. However, the middle cam operates opposed lifters 125 and 127.

It is to be understood that the arrangement is illustrative and opposed exhaust lifters, operated by a single exhaust cam in the mid span flanked by two intake cams, is also within the scope of the invention.

In this arrangement, referring to FIGURE 25, it will be noted that the two exhaust cams 122 and 124 will be deflected by alternate and opposite spring loads imposed against intake cam 126.

The cam profiled heel, in accordance with the invention, to counteract these deflections, is illustrated in FIGURE 28. The depressed portion of the profiled heel starts after angular sector 128 and grows deeper in sector 130.

The manner in which the depressed portion functions is illustrated graphically in FIGURE 29. As a prelude to the explanation following, it is to be kept in mind that the deflection diagramed in FIGURE 25 is first in one direction and then in a diametrically opposite direction.

During the angular interval between $90°$ and $180°$, shown in FIGURE 29, the exhaust valve 122 of cylinder #1 gradually closes. At the end of this closing stroke, the spring load acting upon lifter 125 of intake cam 126 of cylinder #1 comes into play, imposing a camshaft deflection and thereby causing a compensation by the hydraulic lifter 121 of exhaust cam 122. At about $270°$, where valve 126 closes, the camshaft deflection is relieved. This would normally tend to force exhaust valve 122 prematurely open. However, the depressed portion propitiously provided to the profiled heel of cam 122 in angular sector 130 comes into effect, as shown in FIGURE 28, thus keeping the exhaust valve 122 closed.

An unusual region exists between $270°$ and $360°$, conforming to the latter part of sector 130. Here the deflection of exhaust cam 122 is reversed by the action of an opposite spring force acting on cam 126 caused by opening the intake valve of cylinder #2. This, in effect, doubles the deflection at exhaust cam 122, and is the reason why the depressed portion becomes deeper near the latter part of angular sector 130 in FIGURE 28.

The opposite direction deflection imparted to the camshaft must be counteracted, else the valve will be forced open for this interval on the heel. It will be noted from FIGURE 29 that all deflections are counteracted by the depressed portion of FIGURE 28; therefore, the valve 122 remains properly closed until $360°$ where the opening properly begins again. In like manner, exhaust cam 124 requires a similar depressed portion on the heel as illustrated in FIGURES 28 and 29.

*The intake cam profiled heel for opposed-piston engines: three cams within bearing span; FIGURES 30–34*

The same camshaft section containing three cams within a bearing span, as in FIGURE 25, has been reproduced in FIGURE 30. Again in this arrangement, it is to be noted that cam lobes 122 and 124 each actuate only one lifter, whereas the intake cam lobe 126 operates opposed lifters 125 and 127. A complex deflection of cam 126 is the result.

As shown in FIGURE 32 reading from left to right, opening of intake valve of cylinder #2 by cam 126 acting on lifter 127, imposes an upward camshaft deflection that is partially balanced by the opening of exhaust valve of cylinder #1 by cam lobe 122.

Later, the opening of the opposite intake valve of cylinder #1 by cam lobe 126 acting on lifter 125 imposes a downward deflection adding to the downward deflection caused by cam lobe 122. This is somewhat balanced by the subsequent opening of the exhaust valve of cylinder #2 by cam lobe 124. Finally, the reopening of intake valve of cylinder #2 by cam lobe 126 adds to the upward deflection imposed by cam lobe 124.

The net result of the foregoing rather complex loading of the different cam lobes produces a resultant deflection curve at the intake cam 126, as indicated graphically in FIGURE 32.

The manner in which the heel of the intake cam is profiled in both sectors 132 and 134 is shown in FIGURE 33. The function of the profiled heel of FIGURE 33 is illustrated graphically in FIGURE 34.

The intake valve of cylinder #2 in FIGURE 30 closes at 180°. The profile of cam 126 for sector 132 illustrated in FIGURE 33, counteracts the effect of the initial deflection imposed from the opposite direction between 180° and 270° by the loading on cam lobe 122 and the later deflection caused by loading cam lobe 126 to open intake valve of cylinder #1. This keeps the intake valve of cylinder #2 at zero lift. The further deflection encountered by the overlap of exhaust cam lobe 122 with the intake cam lobe 126, both operating valves of cylinder #1, begins at about 270° as illustrated in FIGURES 32 and 34. This compound deflection is counteracted by the depressed portion of the profile in about the central part of the heel as shown in FIGURE 33. As the exhaust valve of cylinder #2 then opens by cam lobe 124, the deflection is counteracted somewhat in the opposite direction so that the depressed portion returns to a more shallow level as the sector 134 progresses. Therefore, between 270° and slightly before 360°, the changing profile functions to keep the valve at zero lift.

*Elevated profiled heel: FIGURES 35–37*

In these figures of the drawings, a logical extension of the invention to include relatively elevated profiled heel portions is shown. Thus, the broad principle is extended by providing a specific portion of a novel profiled cam heel of the invention relatively higher, in elevation, then another portion of relatively lower elevation.

As developed hereinbefore, the relatively depressed portion of the novel profiled heel functions to counteract undesired, but existing, lifter compensation when the lifter is riding on that portion of the novel profiled heel and camshaft deflection has been simultaneously removed.

In this logical extension of the invention, undesired lifter compensation is prevented by the expedient of a novel profiled cam heel portion that is relatively elevated to an extent equalling camshaft deflection. Thus, when camshaft deflection takes place, this elevated heel portion in effect retains the lifter in a condition equivalent to that provided by a theoretically rigid camshaft.

Thus, the undesired lifter compensation is prevented.

To develop this logical extension further, reference is made to FIGURES 35, 36 and 37.

FIGURE 35 represents an exhaust cam 200 in front of an intake cam 202, for illustrative purposes, it being assumed that there are these two cam lobes only within a bearing span. Although the novel profiled heel shown will differ somewhat from the heel profile for three or four lobes within a bearing span, and the manner in which the intake and exhaust cams are oriented in such a configuration, FIGURE 35 nevertheless depicts a typical mode of operation.

Relative to the exhaust cam 200, as shown in FIGURE 35, it will be noted that the quadrant 204 in the early portion of the profiled heel is elevated beyond the circle 206 representing a base circle as used in cams of the prior art. In the quadrant 208, which lies in the latter portion of the novel profiled heel of the exhaust cam 200, the operating surface 210, though relatively depressed compared to the relatively elevated surface 212 of the earlier quadrant 204, is substantially at the circle dimension 206.

It will be noted that this is the converse of the embodiments shown hereinbefore wherein a functional portion was developed by depressing a portion below the periphery of the circle. Although the same function is produced in counteracting valve interactions from camshaft deflections, here lifter compensation is prevented rather than being nullified after it has taken place as in the foregoing embodiments.

To further develop this description, identifying numerals are applied to FIGURE 36. Thus, the intake cam 202 has a quadrant 214 in the early portion of the heel where the working surface 216 is at the circle line 206. In the latter portion quadrant 218, the working surface 220 is relatively elevated above the circle 206.

Note that the arrangement is the opposite of FIGURE 35.

In view of the foregoing, the function of the novel profiled heel for the exhaust cam 200 as well as the novel profiled heel of the intake cam 202 can now be developed by reference to FIGURE 37. Proceeding from left to right in FIGURE 37, it will be noted that the exhaust 200 starts to open between 100° and 120°. By reference to FIGURE 35, the correlatives are shown. Between 120° and 180° the lobe 201 causes the valve to open to a maximum extent. Between 180° and about 240° there is a maximum closing with the closing ramp being encountered a little beyond 240°. The closing terminates just short of 270°. Thereupon, the lifter will ride the functional surface 212, which will be uppermost in FIGURE 35 at this time, for the remainder of the revolution.

*The intake action*

Retracting now to 120°, it will be noted that as the exhaust cam 200 proceeds to a maximum open position at 180°, camshaft deflection represented by spring loading reaches its maximum, beginning at 120° and becoming maximum at about 150°, and remaining so to about 200° where it is rapidly diminished because the lobe 201 passes and the novel profiled heel takes over.

Under maximum spring loading and thus during camshaft deflection, the quadrant 218 of the intake cam 202, FIGURE 36, is uppermost, i.e. in contact with the lifter. Due to the elevated functional surface 220, camshaft deflection is counteracted and the lifter is not permitted to undesirably compensate, as in the prior embodiments of the invention. Then, in quadrant 214, after the lobe 201 of exhaust cam 200 has passed and maximum spring load and consequent deflection are removed, the lifter can ride the surface 216, FIGURE 36, which is at the circle 206 line, without causing the valve to be improperly forced open, because the lifter is "normal."

From the foregoing, it will be understood that the camshaft deflection increment is substantially equivalent to the elevation produced by working surface 220, FIGURE 36, as represented by increment elevation $a$ in the FIGURE 37.

Continuing to read from left to right in FIGURE 37, it will be understood that the increment elevation $b$ which is shown somewhat greater than $a$ for purposes of illustration, will function in the same manner when the intake lobe 203 is in contact with the lifter, thus causing deflection of the camshaft when the functional surface 212 of quadrant 204 of exhaust cam 200 is in contact with its lifter.

The foregoing, therefore, presents a logical extension of the invention where undesired lifter compensations are prevented by elevating a portion of the novel profiled heel to an extent equal to camshaft deflections produced by valve interactions.

It is to be understood that this extension is applicable to the various engine ramifications discussed herein, including in-line, V, opposed-piston, etc.

The invention is more particularly applicable to undesired hydraulic lifter compensation arising from camshaft deflections. However, the invention is also applicable to self-adjusting mechanical lifters, operating with zero clearance, which compensate as a result of camshaft deflections.

The invention is also applicable, to a degree, to malfunctions produced by camshaft deflections when using mechanical tappets intended to operate with a small amount of fixed lash. Thus, if mechanical tappets are improperly adjusted with insufficient lash and if camshaft deflections are excessive, then mechanical interaction between adjacent cams may produce valve loading and opening during the normally closed interval.

*The rigid camshaft engine*

As a logical extension, the present invention is also applicable to engines in which a very rigid camshaft is used, and valve and engine deflections cause the cam heel to become loaded during a substantial portion of its interval. As a result of this loading, the hydraulic lash adjuster does not have as much time as normally to compensate. The cam follower also becomes subjected to excessive localized scuffing and wear in the critical central area so that the action of the lash adjuster and the cam follower becomes impaired. Thus, a compensation malfunction is introduced into the hydraulic lash adjuster. A malfunction is also introduced into the follower by the localized scuffing action. Thus, the proper action of the entire valve gear is impaired.

In accordance with the invention, cam heel profiles, amplitudes and angles are provided, as required, in order to keep this loading to a minimum when the engine is operated under normal conditions.

In this extension of the invention, these cam heel profiles are required in the same general regions as in the cases of the flexible camshafts discussed above, where valve spring loads cause camshaft deflections and valve interactions. In the case of flexible camshafts, the greatest amplitude is generally on the exhaust cam due to its location. However, in the present situation, due to the greater size of the intake valve, a greater profiling amplitude will be provided on the intake cam heel due to the greater flexibility of the intake valve and due to the flexibility of the engine head and valve seat.

Actually within the scope of the invention, all forms of deflections, such as engine head, cylinder, valve, rocker arm, pushrod and camshaft, are encompassed by the term "profiling the heel" to provide a profile or contour for the heel of the cam which is essentially nonuniform radially as distinguished from a base circle of uniform radius of the prior art.

*The combustion effect in a rigid overhead camshaft engine analyzed; FIGURE 38*

For purposes of further illustrating the problem solved by the invention, references are made to FIGURE 38. The head 230 of the valve 232 is a large, thin, shell-like structure that is subject to distortion under high pressures, as produced by combustion. Also, the valve seat 234 in the engine head 236 is large and this tends to render the engine head 236 flexible or certainly subject to flexure during the combustion interval when extremely high pressures are produced.

The high force on the valve head 230 in the arrow direction 238, during the combustion interval produces an elongation of the valve. Also, pressure on the engine head 236, causes a shortening of the distance between the valve seat 234 and the centerline 253 of the camshaft 244. See the dimension D in FIGURE 38.

In the engine of FIGURE 38, which is of the very latest design, there is a combined use of hydraulically actuated lash adjusters 242 (equivalent to hydraulic cam follower or lifter) with a very rigid overhead camshaft 244. As distinguished from placing the lash adjuster 242 directly between the camshaft 244 and the end of the valve stem 246, the adjuster is placed at the end of an elongated bridge-type cam follower 248. This provides a considerable reduction of the valve gear mass, and diminishes the inertia of the valve gear and provides for a lower camshaft. It will be evident that the adjuster 242 remains stationary in the engine head 236. With this construction, no additional inertia is added to the valve gear. A slight movement of the plunger 250 of the adjuster 242 is the only motion required to maintain zero valve lash.

Within the scope of the invention, the lash adjuster 242 can be mechanical.

The cam follower 248, located directly under the camshaft 244, is used to convert the rotary motion of the cams 240 of the camshaft into reciprocating valve motion. Contact between the cam 240 and the follower 248 is on a ground cylindrical surface. At the valve stem tip, contact is in a milled groove 252 of the follower 248 so that the end of the follower is restrained from movement in a lateral direction.

It is to be pointed out that this system utilizes a camshaft having a large journal immediately adjacent to each cam and the followers 248 are of very rigid construction, as is the camshaft arrangement. Therefore, the camshaft 244 and the followers 248 are considered to provide a rigid system. Therefore, it cannot be presumed that there would be sufficient rocker arm deflection to absorb the valve elongation and engine head deflections. In this system, actual tests have shown that there is too much rigidity in both the camshaft and in the follower system; therefore, problems are produced because the system will not absorb axial valve gear distortions. These problems are developed further below.

The advantages of automatic hydraulic actuated valve lash compensation are well known. However, these devices can produce problems resulting from their inability to absorb very rapid and short interval loadings on the cam base circle.

It will be noted that when the cam 240 passes from the lobe 254, a valve-open position, onto the base circle or valve-closed position, the hydraulic lash adjuster 242 will fill up during the cam base circle interval to produce no lash.

Then, with the valve in a closed position, the cylinder fires and the valve and head distortions enter the system with the hydraulic lash adjuster fully filled. The valve and engine head distortions produce, in effect, a shortening of the valve seat to camshaft centerline distance. There is no flexibility in the camshaft, nor the follower, to absorb these distortions. Further, the lash adjuster cannot collapse or leak-down fast enough to avoid trouble.

This is the precise point at which the trouble arises. The distortions cause the cam follower to become overloaded against the cam base circle during a substantial portion of its interval. The hydraulic lash adjuster 242 is unable to leak-down fast enough to avoid this overload. Thus, the follower and cam base circle become subjected to excessive localized scuff in view of the fact that the follower has a radius and the heel of the cam is also a radius. There is, thus, concentrated arc-to-arc scuffing which scrubs away the oil film, producing metal-to-metal contact. The result at high engine speed is rapid and damaging wear that upsets the action between the cam and the follower, and the wear upsets the normal action of the valve gear, including the lash adjuster.

The hydraulic adjuster leaks down during each cycle when the adjuster is loaded on the lift portion of the cam lobe. Then, during a normal cam base circle interval, it will compensate to remove this lash introduced by leak down. However, the presence of a combustion imposed load on the base circle, substantially decreases the time available for adequate compensation. Lack of adequate compensation produces valve noise.

This undesired loading may occur at any part of the base circle interval and will be related in magnitude to the greatest amount of valve gear deflection or yielding that is produced by the combination pressures.

FIGURES 39 and 39a clearly illustrate the problem. These are reproductions of actual oscillograms of load-time or load-angle diagrams. FIGURE 39 shows the actual loads imposed on the intake and exhaust cams by normal valve gear action, and due to combustion at full throttle and low speed (1,200 r.p.m.). The peak loading on the cam base circle is in the order of 60 lbs. on the intake and about 30 lbs. on the exhaust. The desired loadings on the base circles have been superimposed in dotted lines beneath the blips which indicate the actual, but undesirable, loading. Thus, the desired loading would be minimal during the cam base circle interval, to permit the lifter to compensate in a normal manner, and thus provide normal valve gear operation.

FIGURE 39a shows the actual loads imposed on the intake and exhaust cams by normal valve gear action, and due to combustion at full throttle and high speed (4,200 r.p.m.). The peak loading on the cam base circle is in the order of 100 lbs. on the intake and 80 lbs. on the exhaust. The desired loadings on the base circles have been superimposed in dotted lines beneath the actual and undesired curve loadings as in FIGURE 39.

*The invention applied; FIGURES 40, 41, 42 and 43*

By the invention, the cam heels are suitably profiled so that when the loading occurs the profiled portions of the heel provide instant relief. FIGURE 40 illustrates the amount of total deflection, including both valve and cylinder seat deflection that is taken into consideration in arriving at the profiling shown in FIGURE 43. FIGURE 41 illustrates, in greater detail, the amount of intake valve deflection that is taken into account in arriving at the total profiling shown in FIGURE 43.

Relative to the exhaust valve, FIGURE 42 illustrates, in greater detail, the amount of exhaust valve deflection that is taken into consideration in arriving at the profiling shown in FIGURE 43.

FIGURE 43 is a composite diagram illustrating cylinder pressures as phase related to the intake and exhaust cam heels. It will be noted that both the exhaust and intake cam heels are profiled in aligned areas, each in phase with the combustion pressure loading. The intake cam is profiled on the closing side or angular sector and the exhaust cam is profiled on the opening sector. Thus, the respective angular sectors are each profiled by depressing the surface to a maximum depth, gradation of depth, and angular interval to nullify the maximum valve gear loading that would otherwise be produced by the valve gear distortion, as related to the combustion pressures.

FIGURE 44 is a graph illustrating the effect of application of the cam heel angular segment profiling. The cam heels have the depressed regions angularly related to the cylinder combustion pressure. The profile shapes are related as follows: (1) in shape and amount to the cylinder pressures at maximum pressure of combustion; (2) to the cylinder head and heat deflections; (3) to the intake and exhaust valve head deflections; and, (4) in summary, to the total relative variation (shortening or lengthening) between the valve seat to camshaft centerline distance and the effective length of the valve gear.

The result is that the depressed region nullifies the loading and eliminates the overload.

*Applicability of the invention to other overhead camshaft engines; the principles extended*

FIGURE 45 represents an engine valve gear that is somewhat related to that of FIGURE 38 where the lash adjuster device 256 remains stationary, but for a small amount of movement of the plunger thereof. In this system and in the system of FIGURE 38, the lash adjuster can be either hydraulic or mechanical. In this system, however, as distinguished from the system of FIGURE 38, a centrally pivoted rocker arm 258 is used. However, the rocker arm 258 is too rigid to absorb cam heel loading as caused by an effective shortening of the distance between the valve seat and the cam 268, produced by valve gear deflections.

It will be evident that the head 262 of the valve 264 is a large, thin shell that will dish in as indicated in FIGURE 41, when subjected to combustion pressures. Also, the valve seat 260 in the engine head 266 is large and this tends to deflect the flexible head during the combustion interval. Contact between the rocker arm 258 and the cam 268 is between two arcuate surfaces. This system utilizes a rigid camshaft with a journal adjacent to each cam. Therefore, the problems encountered in the engine of FIGURE 38 are involved here.

The valve lash adjusting device 256 may be either mechanical or hydraulic and cam heel overloading can still occur since neither type of device is designed to absorb these overload forces.

When cam 268 passes from the valve open lobe position onto the base circle, the lash adjuster 256 will compensate to remove the lash. Then, as the cylinder fires, combustion pressure produces valve head and engine head distortions, thereby loading the cam base circle under conditions of no lash. The hammering effect produces instantaneous loading between the rocker contacting surface and the cam base circle. The adjuster 256 is unable to absorb this overloading. This is the precise point at which trouble arises. Thus, the distortion is as instantaneous as the combustion interval. This is admittedly faster than leak down by the lash adjuster, either hydraulically or mechanically. Accordingly, a concentrated contacting portion of the rocker arm and an area of the base circle of the cam become highly loaded during the combustion interval. Localized wear on the rocker arm at the line of contact results. This rapidly destroys the normal action of the valve gear.

*The invention applied*

The cam heels are, accordingly, profiled in the manner shown in FIGURE 43 and the profiling is phase related to cylinder pressures. Correlation of factors, as in FIGURE 44, is followed. Thus, the profiling is related to: (1) cylinder pressure at maximum pressures of combustion; (2) cylinder head and valve seat deflections; (3) intake and exhaust valve head deflection; and, (4) in summary, total variation (lengthening or shortening) between the valve seat to camshaft centerline distance and the effective length of the valve gear.

*A tappet engine; FIGURE 46*

FIGURE 46 represents an engine valve gear that utilizes a purely mechanical tappet with positive clearance provided during the valve closed interval. The valve head 270 is an enlarged shell-like structure that will distort under combustion pressure as indicated in FIGURE 40. The mechanical tappet 272 surrounds the valve spring 274 and is a cup-like structure including a hardened tappet face 276. Lash is adjusted by inserting different thickness lash caps over the end of the valve stem. The camshaft 278 is of rigid design with a journal adjacent to each cam. Obviously, the camshaft 278 is too rigid to absorb cam base circle loadings caused by valve head and engine head distortions resulting from combustion pressures.

The combustion force on the valve head 270 and on the engine head 280 produces a shortening of the distance between the valve seat 282 and the centerline of the camshaft 278; and the solid tappet 272 does not give when the effective shortening exceeds the amount of lash. Contact between the cam base circle 286 and the tappet face 276 is arc-to-flat or line contact. With the cam 284 on the base circle interval, combustion pressure eliminates the lash thereby producing loading on the tappet face. This is the point at which trouble arises since there is absolutely no possibility of the tappet absorbing this base circle loading.

Accordingly, the base circle 286 of the cam 284 and the line contact against the tappet face 276 become highly loaded during the combustion interval. Wear at a localized line on the tappet face results.

*The invention applied*

The cam heels are, accordingly, profiled in the manner shown in FIGURE 43 and the profiling is phase related to cylinder pressures. Correlation of factors, as in FIGURE 44, is followed.

*Combination mechanical tappet—hydraulic lifter engines; FIGURES 47 and 48*

FIGURE 47 represents an engine that utilizes two rigid camshafts 288 and 290. The overhead intake camshaft 288 utilizes a mechanical tappet 292, similar to that shown in FIGURE 46. The tappet 292 surrounds the valve spring 296 and is a cup-like structure including some type of manual lash adjustment as previously described. The camshaft 288 is of rigid design and will not absorb effectively shortened valve seat to cam distances produced by valve gear and engine head distortions. Note particularly the relatively large size of the head 298 of the intake valve 300.

The combustion force produces the wear problem discussed relative to FIGURE 46.

On the exhaust valve side of the engine, the camshaft 290 is rigid and is well supported by the engine block. A rocker arm 302 is used which is of the overhead type in order to reverse direction from the exhaust valve 304 over to the hydraulic lifter system 306. Note the relatively large size of the exhaust valve 304.

The combustion forces also distort the head 308 of the exhaust valve 304. Further, the combustion forces distort the engine head 310 and the result is that the cam base circles are loaded in essentially the same manner as discussed relative to FIGURES 38, 39 and 39A.

In both instances then, of the rigid camshafts 288 and 290, combustion pressures produce distortion of the intake and exhaust valves and of the engine head and increase the line contact loading between the tappet 292 and the lifter of system 306 and the cam base circles. Damaging wear and malfunction result. In application of the invention, the cam heels are accordingly profiled in the manner shown in FIGURE 43 and the profiling is phase related to cylinder pressure. Correlation of factors, as in FIGURE 44, is followed.

FIGURE 48 represents an alternate arrangement of the engine of FIGURE 47. In this arrangement only a single overhead camshaft 312 is used. The mechanical tappet 292 valve gear for the intake valve 300 is the same as in FIGURE 47. Also, a rocker arm 302 is utilized for the exhaust valve 304. In this arrangement, however, the hydraulic valve lifter system 306 is engaged with exhaust cams on the single camshaft 312.

The same valve size is used as in FIGURE 47 along with the same valve gear components. Therefore, combustion pressures distort the head 298 of the intake valve 300 and the head 308 of the exhaust valve 304, as well as the engine head 310. In both instances the rigid camshaft 312 results in high line contact loading between the tappet 292 and lifter of system 306 and the cam base circles. Again, damaging wear and malfunctioning result. In application of the invention, the cam heels are accordingly profiled in the manner shown in FIGURE 43. The profiling is phase related to cylinder pressures. Correlation of factors, as in FIGURE 44, is also followed.

*Extended scope of invention; elevated profile heel-rigid camshaft engine*

As was described relative to FIGURES 35, 36 and 37, the logical extension of the invention includes relatively elevated profiled heel portions. Thus, the broad principle is extended by providing a specific portion of a profiled heel that is relatively higher in elevation, than another part of a relatively lower elevation.

The relatively elevated portion, in this aspect of the invention, functions to controllably position the lifter, which, in turn, nullifies the subsequent loading applied by combustion pressures, when the lifter is riding a subsequent portion of the cam base circle at the normal radius. Thus, the relatively elevated portion serves to provide an environment for normal compensation, so to speak, of the lifter. No lash or cam heel loading is introduced into the system to produce noise or malfunction. The lifter contact with the cam heel is merely maintained at a normal low level to permit proper lifter compensation to occur during the cam heel interval, to remove the lash developed during the valve gear action.

Thus, in this extension of the invention, a portion of the heel is relatively elevated above the normal radius of the base circle at regions before and after the combustion loading zone. The elevated regions are, in effect, phase related to the combustion pressure application. When the cam heel tends to load by the combustion pressure, the lifter is on the normal base circle radius, but loading has been avoided. Thus, undesired cam heel loading is prevented.

Reference is made to FIGURES 35, 36 and 37 of the drawings for an indication of the manner in which the elevated extension is to be applied.

The foregoing therefore presents a logical extension of the invention wherein undesired base circle loading is prevented by elevating portions of the cam heel at selected positions, ahead of and behind region in which overload will be encountered, in order to permit normal lifter compensation.

Thus, within the scope of the invention, profiling can include elevated portions of the cam heels that are related to the magnitude and duration of valve gear deflections, suitably phased with the combustion pressures.

What is claimed is:

1. In an internal combustion engine having a valve seat and valve gear components which deflect under cylinder combustion pressure, the engine having a substantially rigid camshaft including a cam having a lobe and a heel, the heel providing valve closing, the valve gear deflections producing a changed cam to valve seat distance, and increased length of valve gear components contained therein, during the combustion interval to produce valve gear malfunction by the cam heel during a portion of its interval, the improvement wherein a portion of said cam heel is profiled to a magnitude substantially equivalent to the deflection of said valve gear during camshaft rotation, whereby the cam heel to follower contact load is maintained under normal light loading with the valve controlled by said cam in a normally closed position during the cam heel interval.

2. The invention of claim 1, wherein said profiled portion is phase related to the combustion pressure producing said valve gear deflection.

3. The invention of claim 1, wherein said heel is profiled to include a portion of elevation magnitude and duration substantially equivalent to valve gear deflection magnitude and duration imposed on said heel during camshaft rotation.

4. The invention of claim 3, wherein said profiled portion is phase related to the combustion pressure producing said valve gear deflection.

5. The invention of claim 1, wherein the cam heel comprises approximately one-half of the total cam angle and includes two angular sectors, and the developed profile of the heel includes a portion of changed elevation, located principally in one of said angular sectors, and of a magnitude to compensate for the deflection imposed on said valve gear during the cam heel interval.

6. The invention of claim 1, wherein the cam heel comprises approximately one-half of the total cam angle and includes two angular sectors, the developed profile of the heel includes a profiled portion located substantially in one of said angular sectors, of a variable elevation magnitude substantially equivalent to the deflection imposed on said valve gear, and said profiled portion being of a length substantially equivalent to that portion of the rotation of the heel of said cam in valve closed position over which the deflection of the valve gear is imposed.

7. The invention of claim 6, wherein said profiled portion is phase related to the combustion pressure producing said valve gear deflection.

8. The invention of claim 1, wherein said cam heel comprises approximately one-half of the total cam angle and includes two angular sectors, and the developed profile of the heel includes a relatively depressed portion located substantially in one of said angular sectors, of a variable depth magnitude, substantially equivalent to deflection imposed on said valve gear, and said profiled surface being of a length substantially equivalent to that portion of the heel of said cam in valve closed position over which the deflection of the valve gear is applied.

9. In a valve gear for an internal combustion engine including a rigid camshaft having a cam, but a valve gear including a valve having a large head which deflects under combustion pressure, the engine having a head with the camshaft mounted therein, said valve having a stem and spring means operable with said stem to close said valve, a fixed position lash adjuster carried by the engine head, a cam follower bridging between said lash adjuster and the end of the valve stem and having a mid portion engageable with the cam of said cam, the camshaft having a lobe and a heel, the improvement wherein a portion of said cam heel is profiled to a changed elevation, of a variable depth magnitude and length duration substantially equivalent to the deflection imposed on said valve gear during the combustion interval while the cam follower is on the cam heel during camshaft rotation.

10. The said invention of claim 9 wherein said profiled portion of said cam heel is phase related to the combustion pressure producing said valve gear deflection.

11. The invention of claim 9 wherein the lash adjuster is hydraulic.

12. In a valve gear for an internal combustion engine including a rigid camshaft having a cam, but a valve gear including a valve having a large head, which deflects under combustion pressure, the engine having a head with the camshaft mounted therein, said valve having a stem and spring means operable with said stem to close said valve, a fixed position lash adjuster carried by said engine head, a rocker arm bridging between said cam and said valve stem and engaging said lash adjuster medially, the cam having a lobe and a heel, the improvement wherein a portion of said cam heel is profiled to a relatively changed elevation, of a variable depth magnitude and length duration substantially equivalent to the deflection of said valve gear during the combustion interval while the cam follower is on the cam heel during the camshaft rotation.

13. The invention of claim 12 wherein said profiled portion of said cam heel is phase related to the combustion pressure producing said valve gear deflection.

14. The invention of claim 12 wherein said lash adjuster is hydraulic.

15. In a valve gear for an internal combustion engine including a rigid camshaft, having a cam, but having a valve with a large head which deflects under combustion pressure, and the valve having an end, the engine having a head with the camshaft mounted therein, said valve having a stem, and valve spring means operable with said stem to close said valve, a mechanical tappet operable with the end of said stem and adjustable to produce fixed lash, the cam having a lobe and a heel, the improvement wherein a portion of said cam heel is profiled to a changed elevation of variable depth magnitude substantially equivalent to the deflection imposed on said valve gear during the combustion interval while the tappet is on the cam heel during camshaft rotation.

16. The invention of claim 15, wherein said profile is phase related to the combustion pressure producing said valve gear deflection.

17. In a valve gear for an internal combustion engine including two rigid camshafts, each having a cam, and including valves operated by said cams which have large heads that are subject to deflection under combustion pressures, the engine having a head with one of said camshafts mounted therein, and a cylinder block with the other of said camshafts mounted therein, said valves each having a stem and spring means operable with said stems to close the valves, the valves operated by said head mounted camshaft each having a mechanical tappet engaging the end of the valve stem, and the cams having a lobe and a heel, the valves operable by said block mounted camshaft having a hydraulic lifter system engaging the cam, plus a rocker arm engageable between said lifter system and the end of the valve stem, the improvement wherein a portion of the cam heel of at least some of the cams is profiled to a changed elevation of a variable depth magnitude substantially equivalent to the deflection imposed on said valve gear during the combustion interval while the tappets and lifters are on the cam heels during camshaft rotation.

18. The invention of claim 17, wherein said profiled portion is phase related to the combustion pressure producing valve gear deflection.

19. In a valve gear for an internal combustion engine including a rigid camshaft having cams, but having intake and exhaust valves each with large heads which may deflect under combustion pressures, the engine having a head with the camshaft mounted therein, said valves each having a stem and spring means operable with said stem to close the valve, the intake valves each having a mechanical tappet engaging between the end of the stem and the cam, the exhaust valves having hydraulic lifter system engaging a cam, and a rocker arm and pushrod engageable between the lifter system and said valve stem, the improvement wherein a portion of the cam heel, of at least some of the cams, is profiled to a changed elevation of a variable depth magnitude substantially equivalent to the deflection imposed on said valve gear during the combustion interval while the tappet and lifter are on the cam heels during cramshaft rotation.

20. The invention of claim 19, wherein said profiled portion is phase related to the combustion pressure producing valve gear deflection.

References Cited by the Examiner

UNITED STATES PATENTS

| | | | |
|---|---|---|---|
| 1,365,735 | 1/1921 | Sherbondy. | |
| 1,543,438 | 6/1925 | Hutt | 123—90 |
| 2,050,766 | 8/1936 | Russell | 123—90 |
| 2,947,296 | 8/1960 | Skinner | 123—90 |

MARK NEWMAN, *Primary Examiner.*

A. L. SMITH, *Assistant Examiner.*